(12) United States Patent
Levine et al.

(10) Patent No.: US 7,013,570 B2
(45) Date of Patent: Mar. 21, 2006

(54) STUD FINDER

(75) Inventors: Steven R. Levine, Mooresville, NC (US); Leslie D. Gist, Huntersville, NC (US)

(73) Assignee: Irwin-Industrial tool Company, Freeport, IL (US)

( * ) Notice: Subject to any disclaimer, the term of this patent is extended or adjusted under 35 U.S.C. 154(b) by 0 days.

(21) Appl. No.: 10/612,199

(22) Filed: Jul. 1, 2003

(65) Prior Publication Data

US 2004/0255477 A1  Dec. 23, 2004

Related U.S. Application Data

(63) Continuation of application No. 10/465,533, filed on Jun. 18, 2003, now abandoned.

(51) Int. Cl.
*G01C 15/00* (2006.01)
(52) U.S. Cl. .......................... 33/286; 33/666; 33/354; 33/332; 324/67; 324/326; 200/61.41
(58) Field of Classification Search .................. 33/286, 33/666, 379, 381, 382, 354, 332; 324/67, 324/326; 200/61.41–61.42, 47, 61.58 R
See application file for complete search history.

(56) References Cited

U.S. PATENT DOCUMENTS

| | | |
|---|---|---|
| 1,153,760 A | 9/1915 | Butler |
| 1,308,809 A | 7/1919 | Reese |
| 1,971,189 A | 8/1934 | Leibing |
| 2,346,773 A | 4/1944 | McBride |
| 2,431,491 A | 11/1947 | Lee et al. |
| 2,512,135 A * | 6/1950 | Bridy .......................... 33/401 |
| 2,600,857 A | 6/1952 | De Le Mater |
| 2,759,696 A | 8/1956 | Nelson |
| 3,278,843 A | 10/1966 | Deming |
| 3,576,409 A | 4/1971 | Fiddler |
| 3,628,874 A | 12/1971 | Tagnon |
| 3,635,565 A | 1/1972 | Colson |
| 3,662,258 A | 5/1972 | Murphy |
| 3,704,413 A | 11/1972 | Blevins |
| 3,713,614 A | 1/1973 | Taylor |
| 3,764,819 A | 10/1973 | Muller |
| 3,805,155 A | 4/1974 | Tsuda et al. |
| 3,820,903 A | 6/1974 | Kindl et al. |
| 3,836,848 A | 9/1974 | Blevins |
| 3,847,708 A | 11/1974 | Kaiser |
| 3,897,637 A | 8/1975 | Genho |
| 3,964,824 A | 6/1976 | Dixon |
| 4,041,382 A | 8/1977 | Washburn |
| 4,067,225 A | 1/1978 | Dorman et al. |

(Continued)

FOREIGN PATENT DOCUMENTS

DE      EPO 416162 A1 *   3/1991

(Continued)

OTHER PUBLICATIONS

Annex to Form PCT/ISA/206, Communication Relating to the Results of the Partial International Search in Application No. PCT/US2004/018739.

(Continued)

*Primary Examiner*—Diego Gutierrez
*Assistant Examiner*—Tania Courson
(74) *Attorney, Agent, or Firm*—Marshall, Gerstein & Borun LLP

(57) ABSTRACT

A stud finder for a light generating device, having a surface and a connection structure on the surface to removably mount either a light generating device or a leveling device thereto.

81 Claims, 13 Drawing Sheets

U.S. PATENT DOCUMENTS

| | | |
|---|---|---|
| 4,086,528 A | 4/1978 | Walton |
| 4,099,118 A | 7/1978 | Franklin et al. |
| 4,111,564 A | 9/1978 | Trice |
| 4,130,796 A | 12/1978 | Shum |
| 4,221,483 A | 9/1980 | Rando |
| 4,310,797 A | 1/1982 | Butler |
| 4,322,678 A | 3/1982 | Capots et al. |
| 4,439,927 A | 4/1984 | Elliott |
| 4,464,622 A | 8/1984 | Franklin |
| 4,536,705 A | 8/1985 | Hayes |
| 4,639,666 A | 1/1987 | Strosser et al. |
| 4,676,100 A | 6/1987 | Eichberger |
| 4,686,454 A | 8/1987 | Pecukonis |
| 4,700,489 A | 10/1987 | Vasile |
| 4,751,782 A | 6/1988 | Ammann |
| 4,752,727 A | 6/1988 | Schneider |
| 4,766,673 A | 8/1988 | Bolson |
| 4,847,552 A | 7/1989 | Howard |
| 4,852,265 A | 8/1989 | Rando et al. |
| 4,853,617 A | 8/1989 | Douglas et al. |
| 4,854,704 A | 8/1989 | Funazaki et al. |
| 4,859,931 A | 8/1989 | Yamashita et al. |
| 4,868,910 A | 9/1989 | Maulding |
| 4,912,851 A | 4/1990 | Rando et al. |
| 4,939,455 A | 7/1990 | Tsugawa |
| 4,947,116 A | 8/1990 | Welcome et al. |
| 4,988,192 A | 1/1991 | Knittel |
| 4,992,741 A | 2/1991 | Douglas et al. |
| 4,993,161 A | 2/1991 | Borkovitz |
| 5,023,484 A | 6/1991 | Pathak et al. |
| 5,033,848 A | 7/1991 | Hart et al. |
| 5,075,977 A | 12/1991 | Rando |
| 5,108,177 A | 4/1992 | Middleton |
| 5,144,487 A | 9/1992 | Hersey |
| 5,148,108 A | 9/1992 | Dufour |
| 5,182,863 A | 2/1993 | Rando |
| 5,208,438 A | 5/1993 | Underberg |
| D339,074 S | 9/1993 | Dufour |
| 5,243,398 A | 9/1993 | Nielsen |
| 5,264,670 A | 11/1993 | Leonard |
| 5,287,365 A | 2/1994 | Nielsen et al. |
| 5,287,627 A | 2/1994 | Rando |
| 5,317,253 A | 5/1994 | Kronberg |
| 5,352,974 A | 10/1994 | Heger |
| 5,367,779 A | 11/1994 | Lee |
| 5,394,616 A | 3/1995 | Claxton |
| 5,400,514 A | 3/1995 | Imbrie et al. |
| 5,406,441 A | 4/1995 | Warda et al. |
| 5,438,265 A | 8/1995 | Eslambolchi et al. |
| 5,457,394 A | 10/1995 | McEwan |
| 5,459,932 A | 10/1995 | Rando et al. |
| 5,481,809 A | 1/1996 | Rooney |
| 5,485,266 A | 1/1996 | Hirano et al. |
| 5,500,783 A | 3/1996 | Warda et al. |
| 5,524,352 A | 6/1996 | Rando et al. |
| 5,531,031 A * | 7/1996 | Green ..................... 33/365 |
| 5,533,268 A | 7/1996 | Keightley |
| 5,539,990 A | 7/1996 | Le |
| 5,541,727 A | 7/1996 | Rando et al. |
| 5,552,886 A | 9/1996 | Kitajima et al. |
| 5,572,796 A | 11/1996 | Breda |
| 5,584,458 A | 12/1996 | Rando |
| 5,594,993 A | 1/1997 | Tager et al. |
| 5,604,987 A | 2/1997 | Cupp |
| 5,606,802 A | 3/1997 | Ogawa |
| 5,610,711 A | 3/1997 | Rando |
| 5,617,202 A | 4/1997 | Rando |
| 5,619,128 A | 4/1997 | Heger |
| 5,619,802 A | 4/1997 | Rando et al. |
| 5,621,975 A | 4/1997 | Rando |
| D382,255 S | 8/1997 | Moffatt |
| 5,655,307 A | 8/1997 | Ogawa et al. |
| 5,666,736 A | 9/1997 | Wen |
| 5,680,208 A | 10/1997 | Butler et al. |
| 5,689,330 A | 11/1997 | Gerard et al. |
| 5,713,135 A * | 2/1998 | Acopulos ..................... 33/451 |
| 5,742,387 A | 4/1998 | Ammann |
| 5,743,021 A | 4/1998 | Corcoran |
| 5,754,287 A | 5/1998 | Clarke |
| 5,754,582 A | 5/1998 | Dong |
| 5,773,971 A | 6/1998 | Tavernetti |
| 5,777,899 A | 7/1998 | Kumagai |
| 5,782,003 A | 7/1998 | Bozzo |
| 5,790,248 A | 8/1998 | Ammann |
| 5,812,057 A | 9/1998 | Hepworth et al. |
| 5,819,424 A | 10/1998 | Ohtomo et al. |
| 5,829,152 A | 11/1998 | Potter et al. |
| 5,836,081 A | 11/1998 | Orosz |
| 5,839,199 A | 11/1998 | Ogawa |
| 5,852,493 A | 12/1998 | Monnin |
| 5,864,956 A | 2/1999 | Dong |
| 5,872,657 A | 2/1999 | Rando |
| 5,896,102 A | 4/1999 | Heger |
| 5,900,931 A | 5/1999 | Rando |
| 5,903,345 A | 5/1999 | Butler et al. |
| 5,907,907 A | 6/1999 | Ohtomo et al. |
| 5,917,314 A | 6/1999 | Heger et al. |
| 5,917,587 A | 6/1999 | Rando |
| D412,674 S | 8/1999 | Kaiser |
| 5,946,087 A | 8/1999 | Kasori et al. |
| 5,967,645 A * | 10/1999 | Anderson ................... 362/259 |
| 5,983,510 A | 11/1999 | Wu et al. |
| 5,992,029 A | 11/1999 | Dong |
| 5,994,688 A | 11/1999 | Jackson et al. |
| 6,000,813 A | 12/1999 | Krietzman |
| 6,005,716 A | 12/1999 | Ligtenberg et al. |
| 6,005,719 A | 12/1999 | Rando |
| D419,545 S | 1/2000 | Krantz et al. |
| D419,546 S | 1/2000 | Krantz et al. |
| 6,009,630 A | 1/2000 | Rando |
| 6,012,229 A | 1/2000 | Shiao |
| 6,014,211 A | 1/2000 | Middleton et al. |
| 6,023,159 A | 2/2000 | Heger |
| 6,028,665 A | 2/2000 | McQueen |
| 6,035,540 A | 3/2000 | Wu et al. |
| 6,037,874 A | 3/2000 | Heironimus |
| 6,043,879 A | 3/2000 | Dong |
| 6,065,217 A | 5/2000 | Dong |
| 6,067,152 A | 5/2000 | Rando |
| D427,166 S | 6/2000 | Krantz |
| 6,073,353 A | 6/2000 | Ghtomo et al. |
| 6,073,354 A | 6/2000 | Rando |
| 6,082,013 A | 7/2000 | Peterhans |
| 6,082,875 A | 7/2000 | Kousek |
| 6,101,728 A | 8/2000 | Keng |
| 6,104,479 A | 8/2000 | Ohtomo et al. |
| 6,163,969 A | 12/2000 | Jan et al. |
| 6,178,649 B1 | 1/2001 | Wu |
| 6,178,655 B1 | 1/2001 | Potter et al. |
| 6,188,228 B1 | 2/2001 | Philipp |
| 6,195,902 B1 | 3/2001 | Jan et al. |
| 6,198,271 B1 | 3/2001 | Heger et al. |
| 6,202,312 B1 | 3/2001 | Rando |
| 6,209,219 B1 | 4/2001 | Wakefield et al. |
| 6,211,662 B1 * | 4/2001 | Bijawat et al. ............... 324/67 |
| 6,215,293 B1 | 4/2001 | Yim |
| 6,249,113 B1 | 6/2001 | Krantz et al. |
| 6,259,241 B1 | 7/2001 | Krantz |
| 6,266,006 B1 * | 7/2001 | Audet ..................... 342/350 |
| 6,301,997 B1 | 10/2001 | Welte |
| 6,313,912 B1 | 11/2001 | Piske et al. |
| 6,351,890 B1 | 3/2002 | Williams |
| 6,360,446 B1 * | 3/2002 | Bijawat et al. ............... 33/451 |
| D455,430 S | 4/2002 | Krantz |

| | | |
|---|---|---|
| D455,750 S | 4/2002 | Krantz |
| 6,363,622 B1 | 4/2002 | Stratton |
| 6,384,420 B1 | 5/2002 | Bozzo |
| 6,384,913 B1 | 5/2002 | Douglas et al. |
| 6,396,433 B1 | 5/2002 | Clodfelter |
| 6,421,928 B1 * | 7/2002 | Miller .................. 33/520 |
| 6,427,347 B1 | 8/2002 | Butler |
| 6,449,856 B1 | 9/2002 | Matsumoto et al. |
| 6,452,097 B1 | 9/2002 | DeWall |
| 6,493,952 B1 | 12/2002 | Kousek et al. |
| 6,493,954 B1 | 12/2002 | Krantz |
| 6,493,955 B1 * | 12/2002 | Moretti .................. 33/451 |
| D469,556 S | 1/2003 | Malard et al. |
| 6,502,319 B1 * | 1/2003 | Goodrich et al. .......... 33/286 |
| D470,423 S | 2/2003 | Loudenslager et al. |
| 6,513,954 B1 | 2/2003 | Ebersole |
| 6,532,676 B1 | 3/2003 | Cunningham |
| 6,536,122 B1 | 3/2003 | Tamamura |
| 6,542,304 B1 | 4/2003 | Tacklind et al. |
| 6,546,636 B1 | 4/2003 | Tamamura |
| 6,568,094 B1 | 5/2003 | Wu |
| 6,593,754 B1 | 7/2003 | Steber et al. |
| 6,604,291 B1 | 8/2003 | Waibel et al. |
| 6,606,798 B1 | 8/2003 | El-Katcha et al. |
| 6,625,895 B1 | 9/2003 | Tacklind et al. |
| 6,637,125 B1 | 10/2003 | Scarborough |
| 6,674,276 B1 | 1/2004 | Morgan et al. |
| 6,688,011 B1 | 2/2004 | Gamal et al. |
| 6,701,636 B1 | 3/2004 | Scarborough |
| 6,871,408 B1 | 3/2005 | Malard et al. |
| 2001/0007420 A1 | 7/2001 | Bijawat et al. |
| 2001/0010460 A1 | 8/2001 | Miller et al. |
| 2001/0029675 A1 | 10/2001 | Webb |
| 2001/0034944 A1 | 11/2001 | Cunningham |
| 2001/0053313 A1 * | 12/2001 | Luebke .................. 408/16 |
| 2002/0135347 A1 | 9/2002 | Morgan et al. |
| 2002/0162233 A1 | 11/2002 | El-Katcha et al. |
| 2002/0178596 A1 * | 12/2002 | Malard et al. ........... 33/286 |
| 2003/0005590 A1 * | 1/2003 | Snyder .................. 33/370 |
| 2003/0061720 A1 | 4/2003 | Waibel |
| 2003/0088993 A1 | 5/2003 | Baida |
| 2003/0101605 A1 | 6/2003 | Tacklind et al. |
| 2003/0101606 A1 | 6/2003 | Li |
| 2003/0106159 A1 * | 6/2003 | Ackeret et al. .............. 7/160 |
| 2003/0106226 A1 | 6/2003 | Tacklind et al. |
| 2003/0110654 A1 | 6/2003 | Scarborough |
| 2003/0110655 A1 | 6/2003 | Scarborough |
| 2003/0110656 A1 | 6/2003 | Scarborough |
| 2003/0110657 A1 | 6/2003 | Scarborough |
| 2003/0145474 A1 | 8/2003 | Tacklind et al. |
| 2003/0177652 A1 | 9/2003 | Sawaguchi |
| 2003/0201783 A1 | 10/2003 | Steber et al. |
| 2003/0218469 A1 * | 11/2003 | Brazell et al. ............. 324/637 |
| 2003/0229997 A1 | 12/2003 | Gamal et al. |
| 2003/0231203 A1 | 12/2003 | Raskin et al. |
| 2004/0000918 A1 | 1/2004 | Sanoner et al. |
| 2004/0016058 A1 * | 1/2004 | Gardiner et al. .............. 7/119 |
| 2004/0031163 A1 | 2/2004 | El-Katcha et al. |
| 2004/0078990 A1 * | 4/2004 | Boys .................. 33/528 |
| 2004/0205972 A2 * | 10/2004 | Wu .................. 33/286 |

FOREIGN PATENT DOCUMENTS

| | | |
|---|---|---|
| GB | 2 188 432 | 9/1987 |
| WO | WO 87/00933 | 2/1987 |
| WO | WO 94/04932 | 3/1994 |
| WO | WO 98/51994 | 11/1998 |

OTHER PUBLICATIONS

International Search Report, Form PCT/ISA/210 in Application No. PCT/US2004/018739.

Written Opinion of the International Searching Authority, Form (PCT/ISA/237) in Application No. PCT/US2004/018739.

* cited by examiner

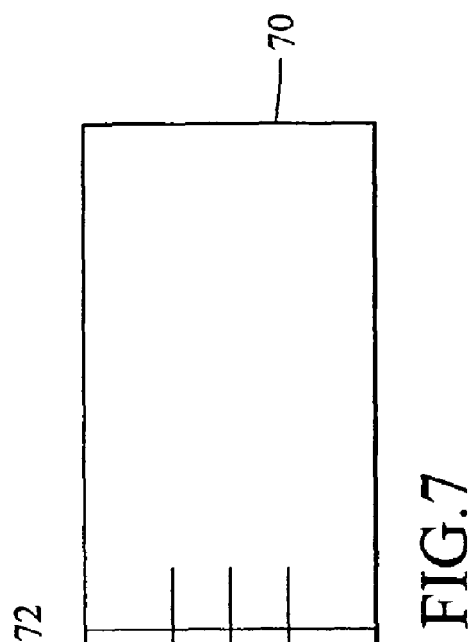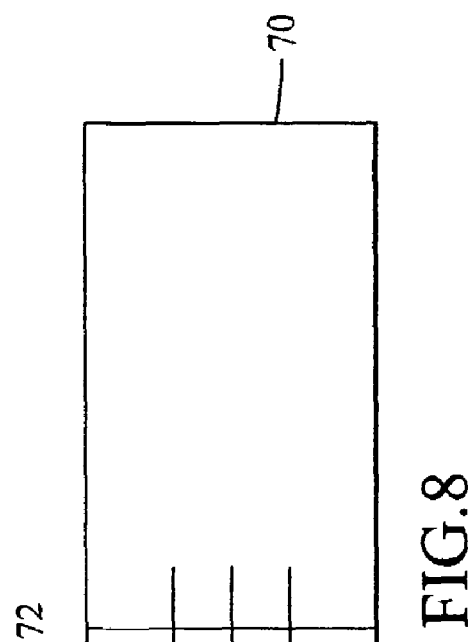
FIG.7
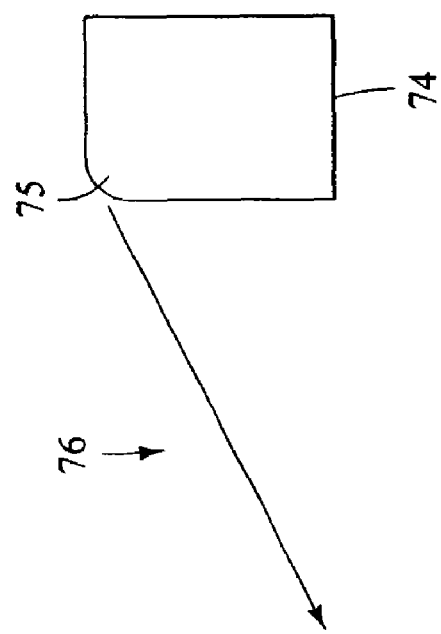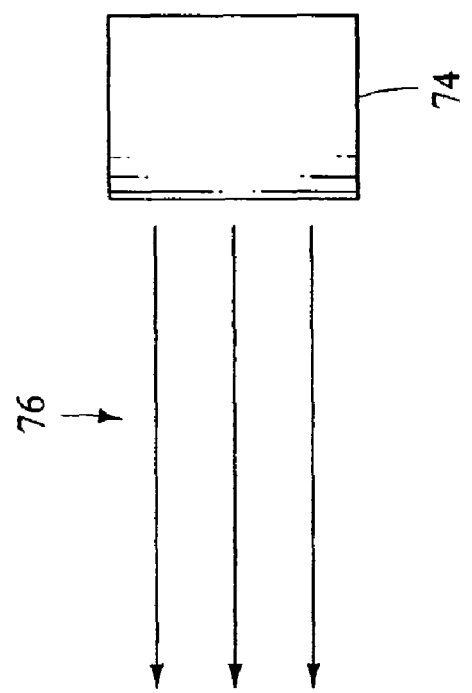
FIG.8

STUD FINDER

The present application is a continuation of, and claims the benefit of priority under 35 U.S.C. §120 of, U.S. pat. appl. Ser. No. 10/465,533, filed on Jun. 18, 2003 now abandoned, which is hereby incorporated by reference in its entirety.

BACKGROUND

The technical field is that of alignment devices and stud finders that allow for easy location and marking of supports underlying a surface on which alignment is desired.

Alignment of surfaces is a perennial problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and chalk lines. A home interior decorated with pictures and other wall ornamentation makes a much better appearance when the ornamentation is aligned, especially with respect to vertical or horizontal alignment. Many mechanical and electrical alignment devices are available, and some laser devices are available. Some of these products are cumbersome, others are not as useful as they could be. Chalk lines, for instance, are undesirable for use in interior areas.

One aspect of alignment-product performance, and in particular of laser-alignment products, that could be improved is the width, brightness and straightness of the laser light. A visible, straight laser line is acceptable, but may be limited in its brightness over a distance, and may also tend to defocus and become dimmer as a user works away from the source of the laser. Rotating lasers are used to project lines on walls perpendicular to the direction of propagation of the laser. Thus, such devices may have limited utility or may not work in confined spaces requiring a longer alignment tool.

Moreover, a conventional laser is not well-equipped for projecting a flat or planar beam of light. The essence of laser light is that it is coherent or substantially monochromatic, that is, of a single wavelength or a narrow wavelength band. Thus, when a beam of laser light is refracted through a prism, the prism output is not a spreading of the beam as with ordinary "white" light, but rather a coherent, focused beam, very similar to the input. The laser beam is thin and is usefully only visible when projected onto a surface.

Another aspect that could be improved is the inability of laser devices to work around obstructions. That is, if a wall-hanging, such as a picture frame, interrupts the laser beam, it may be blocked from further projection. Therefore, it is necessary to mark locations or heights, one by one, rather than working with the actual objects, in order to align them. Obstructions may include moldings placed in a doorway, picture frames in the way of those being aligned on one horizontal line, the operator of the device, or even textured or stuccoed surfaces on interior walls.

There are devices that direct a laser beam parallel to but away from a surface requiring alignment. A marker device or detector component is then used to sight the beam and mark corresponding locations on the wall adjacent the beam. Use of such a device requires multiple components and at least two people, one to align the laser and another to mark the wall. Moreover, the wall itself requires marking with this method.

A conventional laser beam projector is thus not able to project a laser line on the wall on which it is mounted, nor can it go around obstructions. A laser alignment beam mounting on the wall where alignment is needed would allow a person seeking alignment, whether a carpenter, a painter, or an interior decorator, to accomplish his or her task in a quicker and easier fashion. The ability to work around obstacles would save much time and effort. Such laser alignment devices must be aligned themselves, and are typically equipped with a tripod, which is supported on a floor separate from the surface where alignment is desired. The tripod assists a sophisticated leveling device so it reads true for horizontal and vertical plumbs. While leveling is necessary, such sophistication as a tripod adds to the expense and bulkiness of the leveling device. What is desired is a convenient, easy-to-level laser device useful for aligning objects. It would be even better if the alignment device were combined with a stud finder in order to detect and mark supports or studs hidden behind walls or other surfaces. A user of the alignment device could then detect studs or other objects behind walls and mark their location. These locations could then be used when placing anchors or other objects in the wall or surface. Better alignment devices are thus required to overcome these deficiencies in the prior art.

BRIEF SUMMARY

One aspect of the invention is a stud finder for a light generating device, having a surface and a connection structure on the surface to removably mount either a light generating device or a leveling device thereto.

Another aspect of the invention regards a device having a stud finder that includes a connection structure and a surface. A light generating device is removably attached to the stud finder via the connection structure.

Another aspect of the invention is a device that includes a stud finder. The stud finder comprises a housing with a surface, and a normally-open switch protruding through the surface.

Another aspect of the invention regards a device having a stud finder that includes a connection structure and a surface, and a normally open switch protruding through the surface.

Another aspect of the invention regards a device having a stud finder that includes a connection structure and a surface. A leveling device is removably attached to the stud finder via the connection structure.

Another aspect of the invention regards an accessory attachment for a light generating device or a leveling device, including a structural detector having a surface that includes a connection structure to receive and mount either a light generating device or a leveling device thereto. A marking feature is at least partially enclosed within the structural detector.

Another aspect of the invention regards a method for finding a concealed feature and aligning objects on a surface, the method includes inserting a leveling device into a structural detector, the structural detector including a connection structure to mount the leveling device thereto and a surface. The method further includes placing the surface against a wall, locating at least one concealed feature underneath the wall using the structural detector, and marking the wall along a line defined by the leveling device.

Another aspect of the invention regards a kit for a light generating device with a stud finder, that includes a container defining a volume of space and a stud finder positioned within the volume of space, the stud finder including a surface and a connection structure. A light generating device is positioned within the volume of space so as to be unattached to the stud finder, wherein the connection structure can be used to removably mount the light generating device to the surface.

Another aspect of the invention regards a kit for a leveling device with a stud finder, that includes a container defining a volume of space and a stud finder positioned within the volume of space, the stud finder including a surface and a connection structure. A leveling device is positioned within the volume of space so as to be unattached to the stud finder, wherein the connection structure can be used to mount the stud finder to the surface.

Each of the above aspects of the present invention provides an improved structure and/or method of use of a stud finding attachment.

The following drawings form part of the present specification and are included to further demonstrate certain aspects of the present invention. The invention may be better understood by reference to one or more of these drawings in combination with the detailed description of specific embodiments presented herein.

BRIEF DESCRIPTION OF THE DRAWINGS

FIG. 7 depicts a side view of the workings of a second embodiment of laser light generator optics to be used with the laser line generator of FIG. 1.

FIG. 8 depicts a top view of the workings of the laser light generator optics of FIG. 7.

DETAILED DESCRIPTION OF THE DRAWINGS AND THE PRESENTLY PREFERRED EMBODIMENTS

Figure 1:
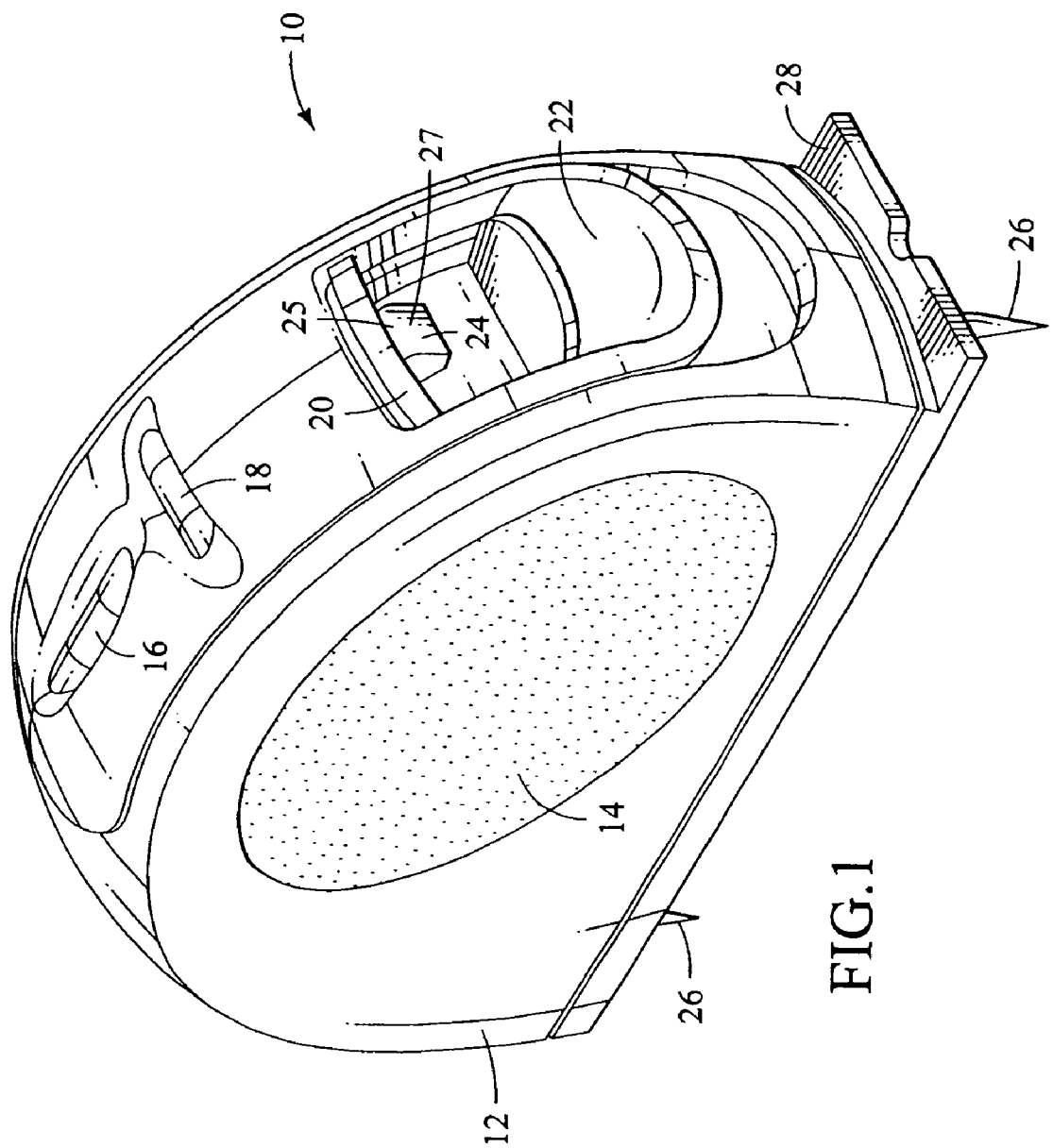
FIG. 1 is an isometric view of an outside of an embodiment of a laser line generator according to the present invention.

The present invention is better understood by reference to the figures and description below. FIG. 1 presents a view of a leveling device, such as laser alignment device and generator 10. The generator comes in a housing 12, which may be made of plastic or other suitable material such as metal. It possesses a handgrip area 14 for handling, the area preferably made of an elastomeric substance for easier gripping. The generator has a first reference level 16, a spirit level or "bubble" for orientation or leveling in one plane, such as horizontal or vertical. It also has a second leveling device 18, for orientation or leveling in a second plane perpendicular to the first plane. The housing also contains a protective door 20 with a linked switch for turning on the laser light source when opening the door for access to the laser beam. The generator also may have one or more sliding pin actuators 22 suitable for use by a finger or a thumb and mechanically connected for extending or retracting one or more pins 26 from the generator bottom 28. Without a stud finder attachment attached to bottom 28, each pin desirably penetrates into a surface, such as a drywall or lumber surface, to suspend and hold the laser generator on the surface while it is in use. FIG. 1 depicts the door 20 in an open position and a projection lens 24. The door or aperture 20 provides an exit for the light generated within the housing, and in the open position, does not substantially block the exit of light from the housing.

As shown in FIG. 1, a preferred projection lens 24 includes a rounded corner 25 on its front face 27. The effect of the lens is to shape the laser light passing through the lens into a planar, fan-shaped "comet beam" or fan shape. The intensity of the light and the shape of the beam may be asymmetric, in which one side of the "comet" may be larger and brighter than the other side. The fan shaped beam is then routed so that the less bright side of the fan-shaped beam is nearest the wall of interest, and the brighter side is away from the wall. In this orientation, the fan-shaped beam of light will propagate a long distance from its origin, and the laser light will be usable a long distance away from the laser line generating device.

The laser light generated by the laser line generator preferably exits from the top, curved corner of the lens. The radius of the corner is desirably from about 0.030 inches (0.75 mm) to about 0.060 (1.50 mm) inches, and preferably about 0.047 inches (1.2 mm). The height of the rounded corner of the lens is desirably one or two inches above the bottom surface of the laser line generating device. When the beam or fan of light exits the lens, it forms a thin plane in the length-wise direction of the device, and the beam forms a plane from the top, curved corner of the lens downward, to the wall or other surface on which alignment is sought. Because the light is now a plane, rather than a pinpoint, it is able to project over and beyond obstacles, allowing a user to align several objects without having to move them.

In the embodiments shown, the laser light projects generally in the direction of the alignment surface, a generally flat, planar bottom support surface. The direction of propagation is the direction the light travels, generally parallel to the wall or surface on which the laser line generating device is mounted. The fan-shaped aspect of the beam is perpendicular to the wall, and is preferably no higher than the height of the lens 24 above the wall. The laser light generating device and its lens are mounted on the wall, and the fan-shape of the beam extends from a height of the lens above the wall to the wall surface itself, in a very thin plane, about $\frac{1}{32}$ of an inch thick. The plane of the fan-shaped beam is also perpendicular to the flat bottom surface of the laser line generating device.

Figure 2:
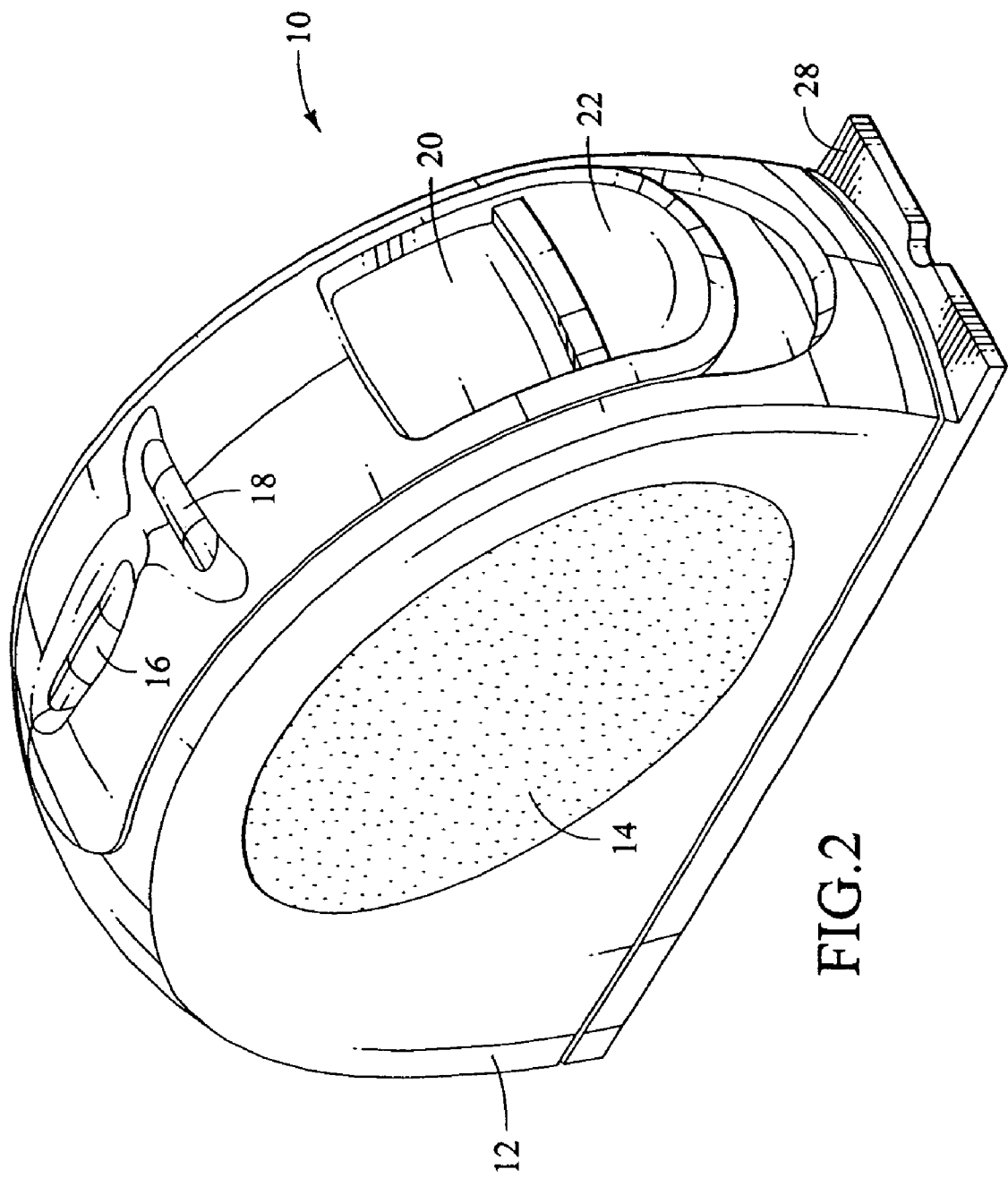
FIG. 2 is an alternate view of the generator of FIG. 1.

FIG. 2 depicts the same device with the door 20 closed, and with a linked internal switch (not shown) open, and the laser thus off. The figure depicts the generator 10, housing 12, gripping surface 14 and levels 16, 18 with pin actuator 22 raised so that the pin remains inside the housing and the laser generator is not suspended on a wall or other surface. The door or aperture 20 may also be a switch for the power supply of the laser line generating device. In the position shown in FIG. 2, with the door closed, the switch is preferably in a closed position and there is no power supplied from the power supply to the light source. In this position, the door acts as a lens cover and substantially blocks the exit of the beam from the device.

Figure 3:
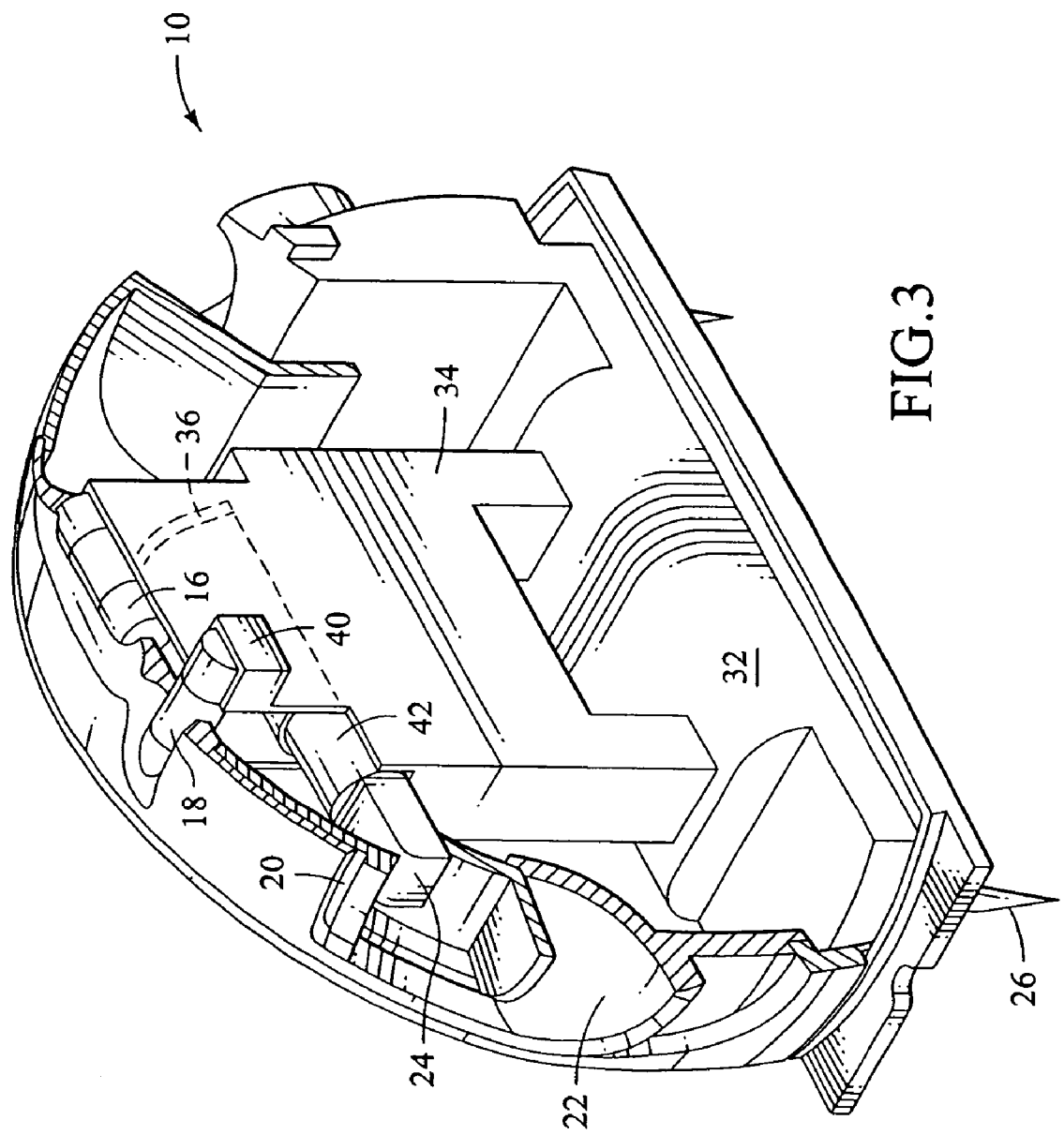
FIG. 3 is a cutaway isometric view showing the inside of the generator of FIG. 1.
Figure 4:
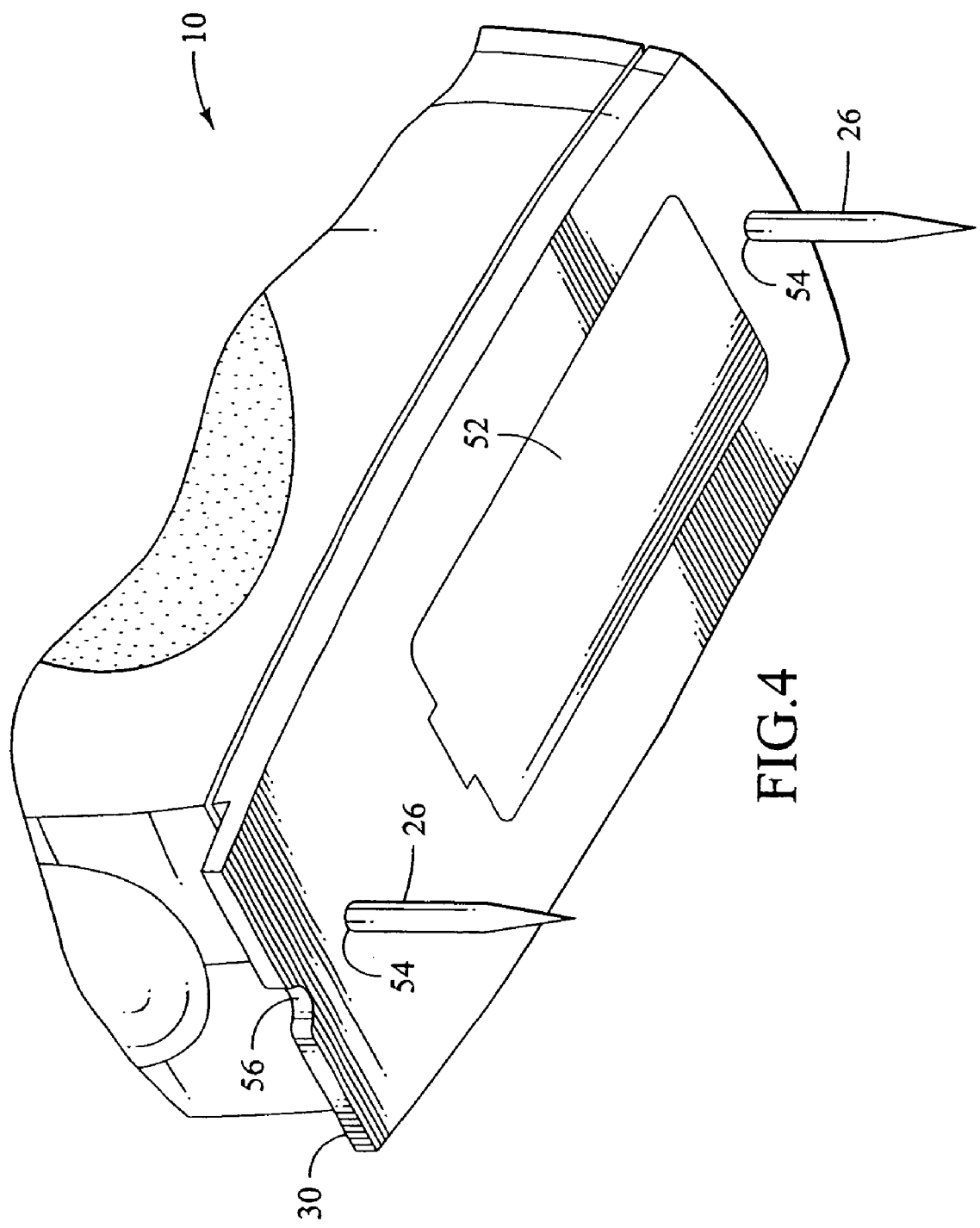
FIG. 4 is a view depicting the bottom of the generator of FIG. 1.
Figure 5:
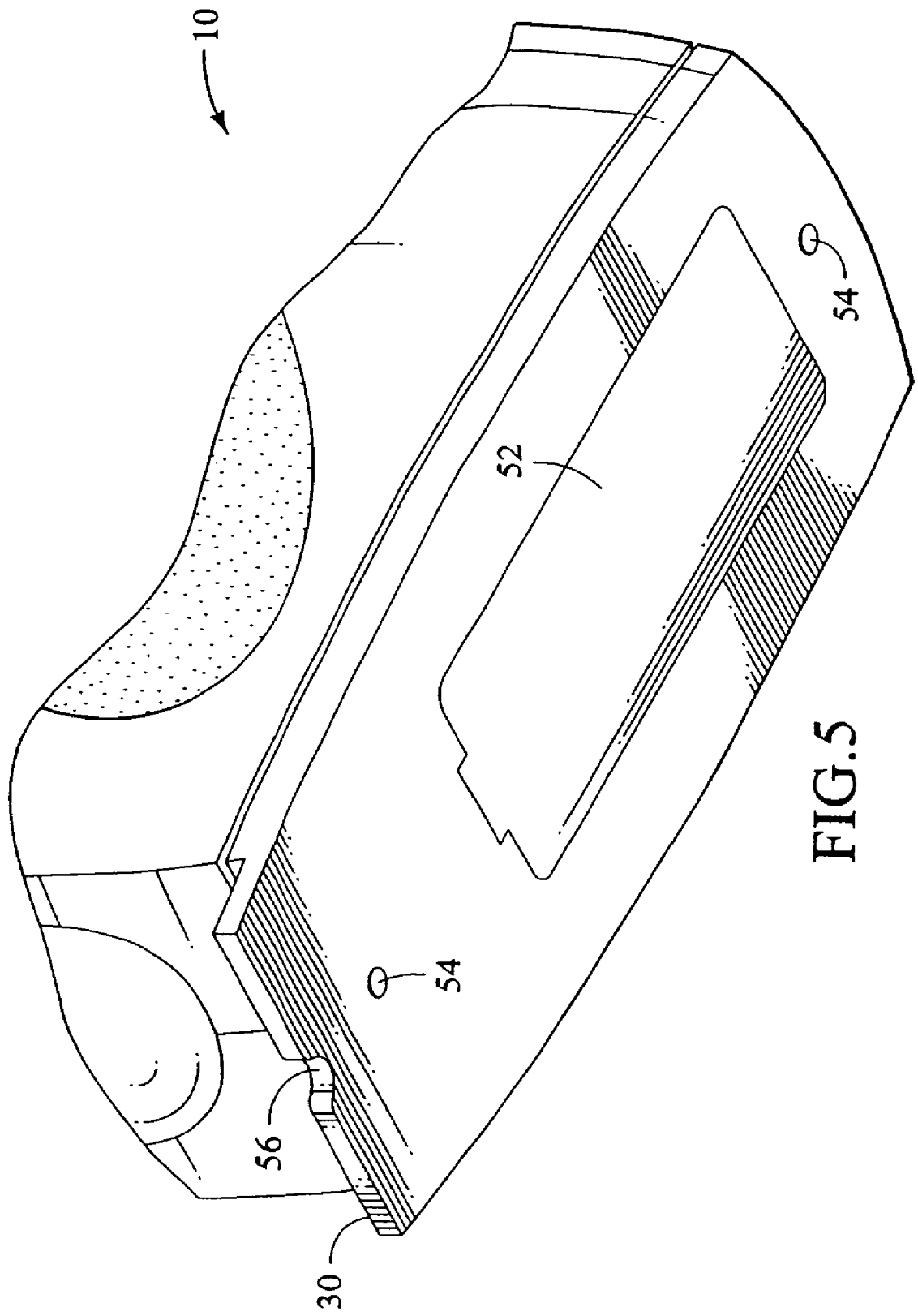
FIG. 5 is another view depicting the bottom of the generator of FIG. 1.

FIG. 3 depicts a cutaway view of the interior of the laser generator, showing a supporting structure 34, 40, for levels 16, 18, and also showing an area for a power source or battery 32, a laser diode 42, a lens 24, and a circuit board 36. FIG. 4 more clearly depicts a view from the bottom or flat face 30 of the generator 10. The bottom surface desirably has a door 52 for access to a battery or power source for the generator. Also shown are holes 54 for the retractable pins 26 used to secure the generator to a wall or a surface. A notch 56 may also be useful for aligning or orienting the generator on a surface. FIG. 5 depicts the bottom of the laser generator with the pins retracted, with a better view of holes 54.

A method of practicing the invention includes providing a surface, such as a wall wherein orientation with a line is desired, and also providing the laser generator. A user mounts the laser generator 10 via its flat surface. The stud finder attachment (see FIGS. 10–13) may also be used in combination with the laser line generator. A user mounts the laser line generator on the wall and orients it in one or more planes, depending on the number of reference levels provided on the generator. The reference level, such as the bubble level 18, is then used to orient the generator in one plane, for instance, the vertical plane. The second bubble level 16 may be used if the user wishes to orient the generator in a horizontal plane. When the user is satisfied with the orientation, the user turns on the generator 10, projecting a laser beam from the vertical or horizontal plane of the device. In one embodiment, the generator is turned on by opening the lens door or aperture.

A desirable feature of the invention is that the output of the generator is not merely a linear beam of light, but rather a fan-shaped beam. The fan-shaped beam propagates along the surface of the wall in the direction of propagation. Because the plane of the beam runs perpendicular to the wall along the length of the beam, the line of intersection between the beam and the wall forms a visible line of alignment. With a fan-shaped beam, the laser light is able to project over and beyond obstacles, such as moldings placed in a doorway, picture frames in the way of those being aligned on one horizontal line, or other obstacles, such as a wavy or stuccoed surface on an interior wall. With a conventional laser generator, these obstacles must be removed or the laser itself must be repositioned to avoid each obstacle. Of course, moving and relocating the laser alignment tool destroys the continuity of the line of alignment. Moreover, a conventional laser is not well-equipped for shaping the laser beam into a fan. The essence of laser light is that it is coherent, that is, of a single wavelength or a narrow wavelength band. Thus, when laser light is refracted through a prism, the prism output is not a spreading of the beam as with ordinary "white" light, but rather a coherent, focused beam, very similar to the input. The present invention overcomes this obstacle by sending a sharp, focused pinpoint of light through a specifically constructed lens to create a flat planar, fan-shaped beam of light.

It is also noteworthy that the axis of alignment, such as the alignment of pictures on a wall, is substantially parallel to the direction of propagation of the laser light. By contrast, a conventional and less useful method is to project a laser light perpendicular to a wall or other surface in which alignment is desired, and perpendicular to the direction of propagation. With the instant laser line marking device, a user projects a fan-shaped beam in a propagation direction that is substantially parallel, rather than perpendicular, to the surface on which alignment is desired, the fan-shaped dimension of the beam being perpendicular to the wall.

Figure 9A:
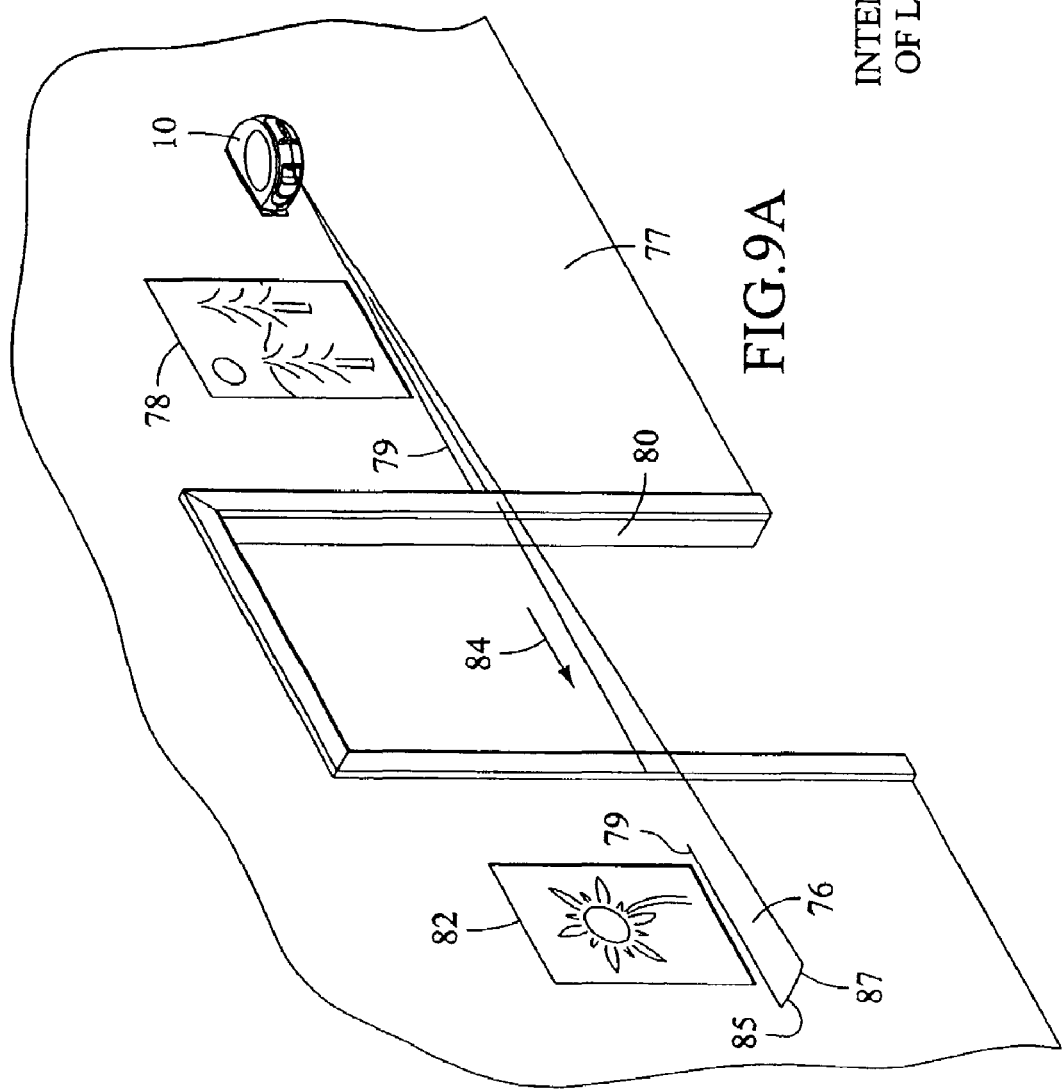
FIGS. 9A, 9B, and 9C depict a laser line generating device projecting the laser light in a narrow beam or fan and aligning objects on a wall.

As seen in FIG. 9*a*, the laser line generating device propagates light in the length-wise direction of the laser line generating device 10. The direction of propagation, shown by arrow 84, is substantially parallel to the wall, with the fan-shaped aspect of the beam being perpendicular to the wall. In one example, if a narrow fan projects from a line marking device according to the present invention, the beam is "substantially parallel" if it is substantially parallel for at least several lengths of the line marking device in the direction of propagation of the laser. It is substantially parallel because even a "narrow" fan spreads rapidly and the beam is no longer strictly parallel. The device and the beam are easily distinguished, however, from a beam that has a direction of propagation perpendicular to the wall, such as shown in U.S. Pat. No. 5,208,438.

The laser light exits the lens or prism in an elongated fan in a direction of propagation. The direction of propagation, as discussed above, is substantially parallel to the surface on which alignment is desired. The width of the fan, however, is perpendicular to the surface, and the intersection of the beam with the surface generates the visible line of alignment that the user seeks. It is this width that allows the fan to project over and beyond obstacles. That is, even though an obstacle may partially obscure the fan-shaped beam of light, at least part of the fan-shaped beam extends above and beyond the obstacle, and a user may continue to align objects on which alignment is desired.

Figure 6:
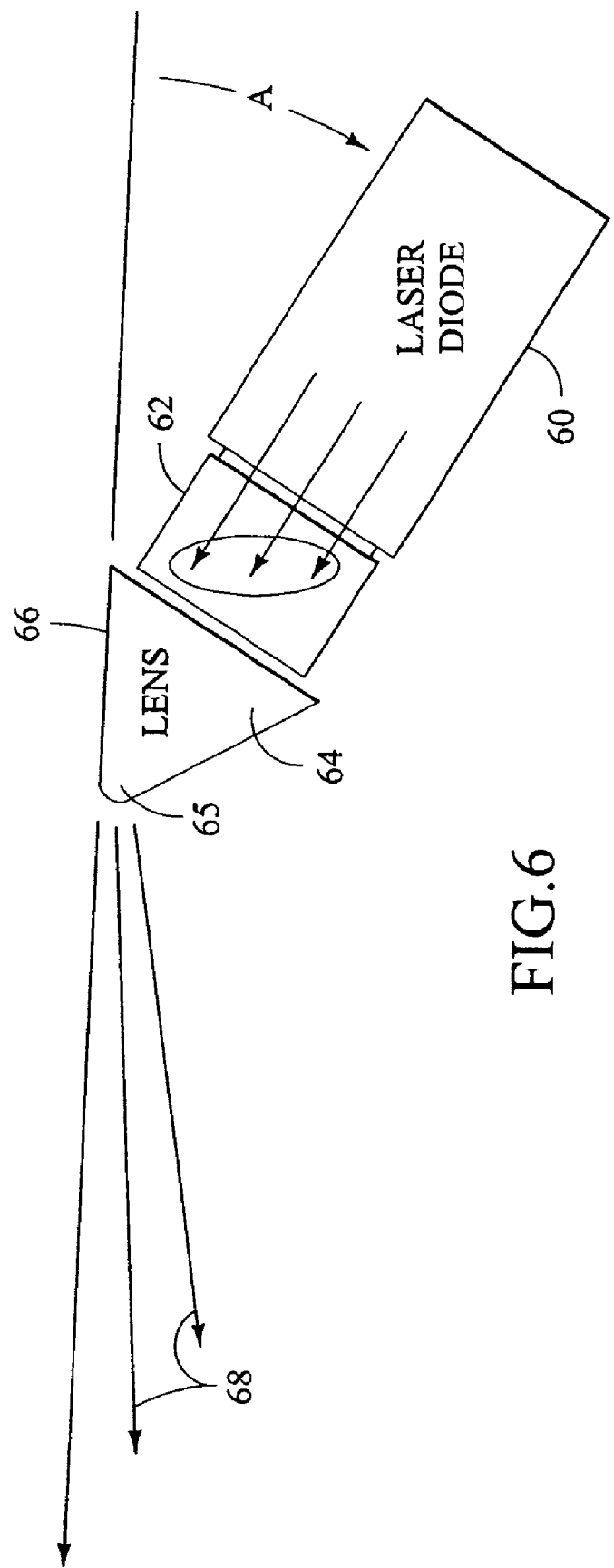
FIG. 6 depicts an embodiment of optics to be used with the laser light generator of FIG. 1.

FIG. 6 depicts an embodiment of the invention, in which a laser diode 60 emits coherent laser light, such as, coherent laser light at 635 nm wavelength. The light is collimated into an ovate shape by collimation optics 62, for instance at least one collimating lens, by techniques well known to those skilled in optic arts. The ovate beam then enters a projection lens 64 from the right side in FIG. 6, desirably at an angle in which total internal reflection will occur, that is, all the incident light will be reflected rather than refracted from the back face of the lens. It has been found that this phenomenon is reinforced further if the back surface 66 of the lens is mirrored. The phenomenon is also reinforced if a corner of the lens or prism is radiused as mentioned above. When the light emerges from the radiused corner 65 of the projection lens 64 in FIG. 6, it is in the shape of a narrow beam or fan, rather than a single point or beam of light, and is able to extend around and beyond obstacles for the convenience of a user. In one embodiment of the invention, the angle A between the mirror surface of the collimating lens and the incident light from the laser diode source is from about 60 to about 65 degrees, preferably about 63 degrees, for maximum reflection of light through the lens, rather than refraction at angles that detract from the performance of the generator. In this depiction, the light 68 is planar within the plane of the paper, when it leaves the lens. In one embodiment of the invention, the laser diode, the collimation lens, and the projection lens are contained within a single element, such as a laser diode with included collimating optics.

In one embodiment shown in FIG. 6, an aspherical projection lens 64 is made from optic grade glass, in the form of an equilateral triangle with the back face mirrored. Desirably, the lens is about 0.45 inches on a side, with one corner 65 radiused to about 0.030 to about 0.060 inches and the other corners rounded to a radius of 0.005 to 0.015 inches. With this geometry, the lens or prism is able to focus an ovate beam into a planar fan-shaped beam useful for aligning objects.

FIG. 7 depicts a side view of another embodiment of the invention, in which a laser light source 70, such as a laser diode, emits laser light, which is collimated into an ovate shape by collimating optics 72 and then sent to an aspherical projection lens 74 with one corner 75 radiused as mentioned above for projection of a narrow fan of light 76. In one embodiment, the axes of the ovate-shaped beam sent to the lens are about 3/16 inches by about 1/16 inch. The planar, fan-shaped beam 76 emerging from projection lens 74 is than about 1/32 inch thick. Note that the top corner 75 on the face of the lens in FIG. 7 is radiused from about 0.030 to about 0.060 inches, and preferably about 0.047 inches. FIG. 8 depicts the same embodiment in a top view, in which the rounding may not be observable. The source of laser light 70 generates visible laser light and the collimating optics 72 shape the light into a narrow beam. From the top view, the beam of light is very thin and is about the width of the projection lens 74, 0.4 inches wide. From the side view, the projected light is a thin beam; from the top view, the projected light is a thin fan.

One embodiment of the invention features a lens, such as the lenses depicted in FIGS. 7 and 8, that is about 0.4 inches (10 mm) square, and about 0.1 inches thick (2.5 mm) in the direction of propagation, that is able to focus the incoming laser light beam and reflect it into a planar fan shape. The lenses are aspherical, cylindrical lenses. The lens may be made from one of several optical-grade clear, highly transparent materials, including BK7 glass having an index of refraction of about 1.5168 and a Vd of 64.17. In another embodiment, acrylic resin having an index of refraction of 1.4917 and a Vd of about 55.31 is useful. It has been found that the lens works better if the exit face has only one corner radiused about 0.047 inches, with the other faces being radiused for normal manufacturing custom, to about 0.005 to about 0.015 inches. More details on the performance of these lenses are discussed in copending application U.S. pat. appl. Ser. No. 10/141,392, entitled Laser Line Generating Device, assigned to the assignee of the present application and which is hereby incorporated by reference in its entirety.

FIG. 9A demonstrates the use of an embodiment of a laser generator 10 according to the present invention, in which a fan-shaped beam 76 is able to align a first picture frame 78 on wall 77. The generator is convenient to use because it projects a laser beam on the wall adjacent the generator. The beam is able to overcome obstacles such as door moldings 80 with its fan shape and extend above the molding with sufficient clarity to align another object, such as picture frame 82. It is able to overcome these obstacles because the corner from which the light exits is one or two inches removed or offset from the wall, allowing a fan or beam of light to form. The direction of propagation 84 generally is in the direction from the generator to the objects on which alignment is desired, such as picture frames. At the same time, the width of the fan is perpendicular to the wall 77 on which the paintings are hung or on which, more generally, alignment is desired. The fan-shaped beam 76 intersects the wall 77 and the light is visible on the wall at the intersection 79 of the fan-shaped beam 76 with the wall 77. In one embodiment, the housing of the laser line generator is a support face that substantially extends along a first planar surface, such as wall 77, and the fan shaped beam 76 substantially lies within a second planar surface, such as the plane of light 76. The second planar surface may intersect the first planar surface at an angle. The angle may preferably be 90°, or a right angle between the fan-shaped beam and the surface on which objects are to be aligned.

Figure 9B:
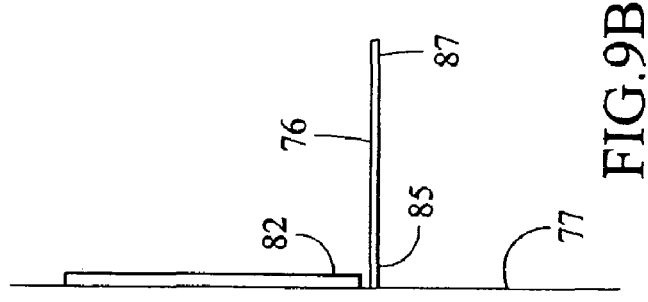
Figure 9C:
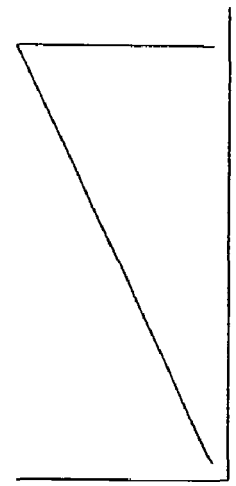

The "comet" effect means that the intensity of the planar fan is less nearer the wall and greater away from the wall, so that the beam is able to usefully travel further, and enable a user to align objects at greater distances. Thus, in FIGS. 9B and 9C, the intensity of the laser light will be greater at outer edge 87 than at the inner edge 85 where the fan-shaped beam intersects the wall 77 while the beam is used to align object 82, such as a picture frame. There is no practical limitation to the distance the fan-shaped beam can travel. Laser diodes of 5–15 mW can be successfully used to project beams 30–50 feet long along painted wall-board surfaces. In one embodiment, the fan-shaped beam is projectable as a visible line extending at least about 5 lengths away from the housing for aligning objects.

Figure 10:
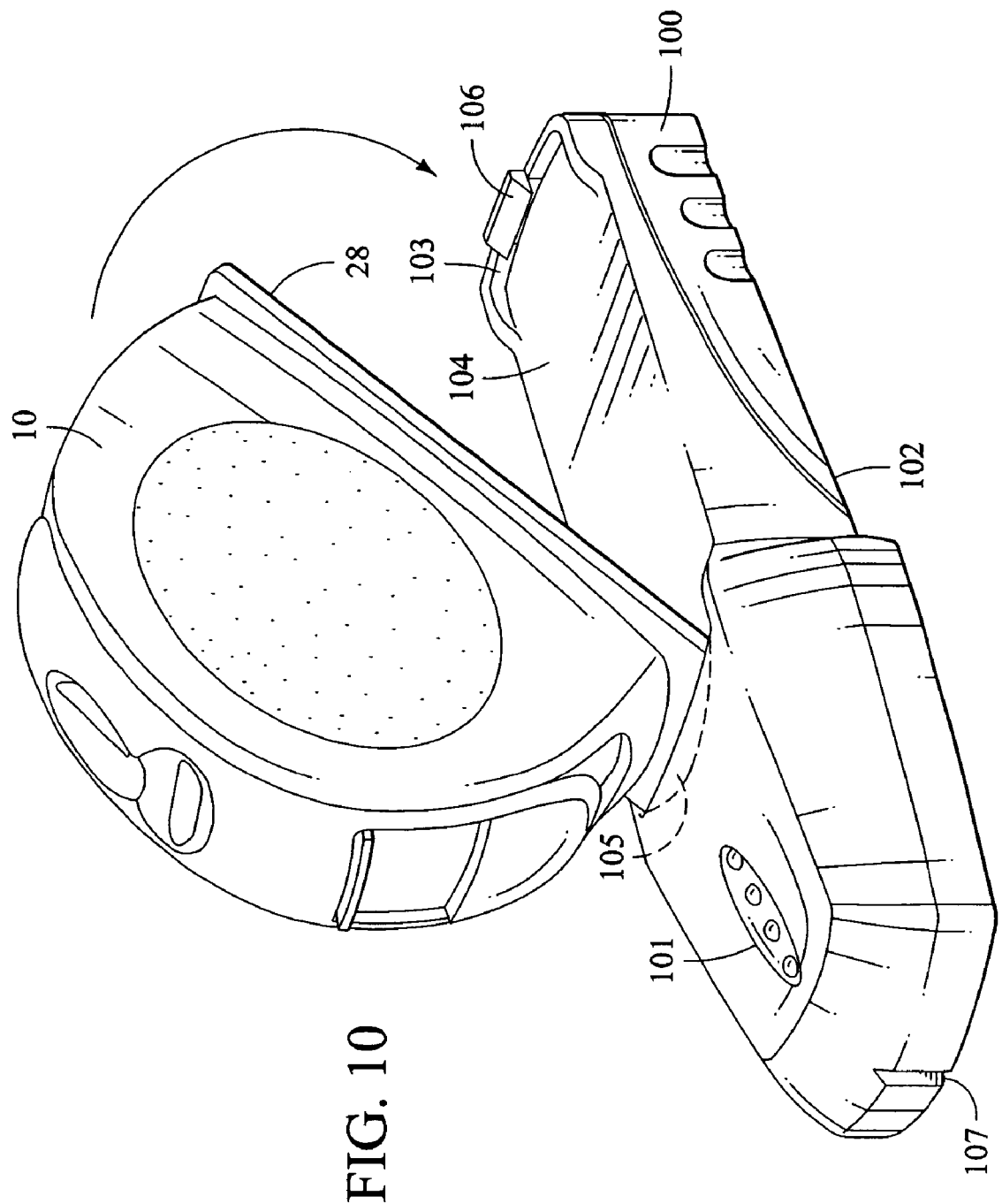
FIG. 10 is a perspective view of an embodiment of a laser line generator and a stud finder attachment.

The laser line generator 10 is may be utilized with a stud finder base or attachment, allowing a user to detect hidden structures behind walls. For example, the user may locate studs or other supports behind walls or other surfaces for supporting objects or decorations that are to be hung on the walls or other surfaces. FIG. 10 is a perspective view of an embodiment of the laser line generator 10 and the stud finder 100. Stud finder 100 includes a housing 101 and a bottom closure 102. Housing 101 and bottom closure 102 may be molded from any suitable plastic, such as polyethylene, ABS, or higher-grade engineering thermoplastic or thermoset material. Any of several molded processes may be used, such as injection molding, compression molding or thermoforming. Other materials, such as metals, may also be used. The housing 101 defines a recessed area having a flat surface mounting face 104 on the housing 101.

Laser line generator 10 with flat bottom 28 is retained within side walls 103 located on the housing 101. Flat surface 104 may also include a front recess 105 for insertion of a front portion of flat bottom 28. Housing 101 may also include a connection structure that includes movable tab or latch 106 to mount the laser line generator in the recessed area with the bottom 28 flush to the flat surface 104. A user inserts the front portion of laser line generator 10 into recess 105 and then pushes tab 106 backwards to insert the back end of the base of the laser line generator. The latch may then be released and the stud finder is captured securely by recess 105 and latch 106. The latch 106 may also be spring mounted or otherwise molded to bias toward the front of the stud finder 100. Stud finder 100 may also have a forward notch 107 for more accurate manual marking of a surface.

In the alternative, the generator 10 may be mounted magnetically to the attachment 100 via magnets on one or both of the surfaces 104 and 28. For example, in another alternative embodiment of the connection structure, either the bottom 28 of the generator 10 or the surface 104 may be provided with a magnet that mates magnetically with either another magnet material, ferrous material, or other material attracted to magnets on the opposing surface. This can retain the laser generator 10 to the attachment 100 without the use of a latching structure.

Figure 11:
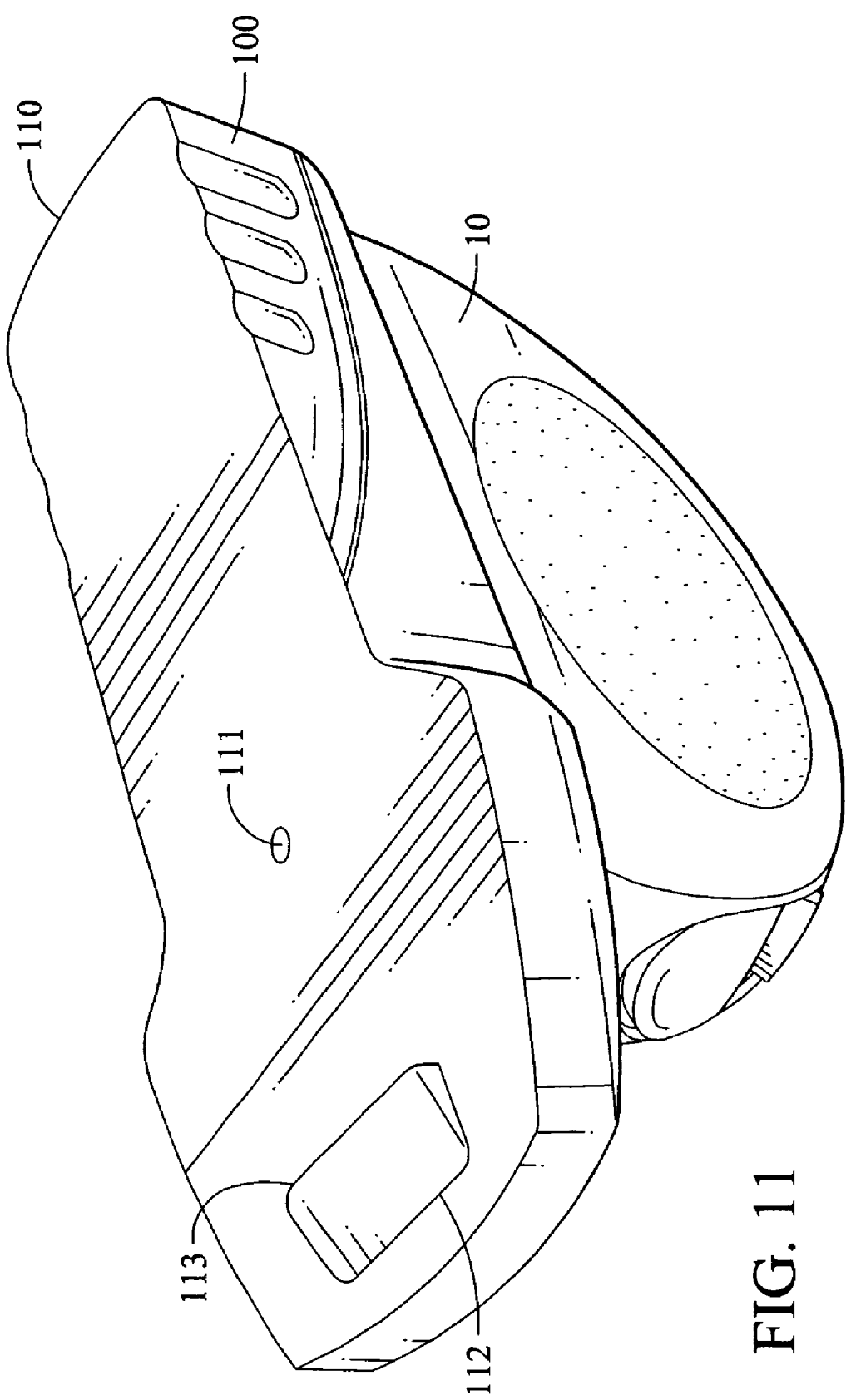
FIG. 11 is a bottom view of the embodiment of FIG. 10.

In another alternative embodiment of the connection structure, the connection structure of FIGS. 10–11 is interchanged so that the bottom surface of the laser line generator 10 includes recess and a latch similar to recess 105 and latch 106, respectively. The stud finder attachment and laser line generator are attached to one another by inserting the top portion of the attachment into the recessed area of the bottom surface of the generator and then applying the latch in a manner similar described previously with respect to the embodiment of FIGS. 10–11.

FIG. 11 depicts the bottom view of the stud finder attachment 100 when attached to laser line generator 10. Bottom surface 110 is flat and defines an orifice or opening 111 for a marking feature and a second orifice 112 for a touch or press switch 113. When a user presses bottom surface 110 against a wall or other surface, switch 113 is depressed, activating the stud finder.

Figure 12:
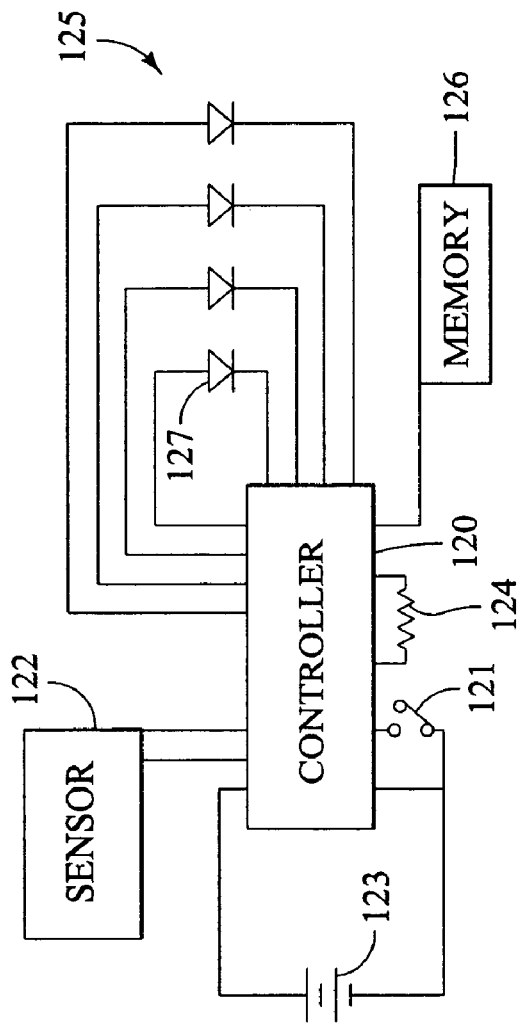
FIG. 12 is a schematic diagram of an embodiment of a control system for the stud finder attachment of FIG. 10.

Stud finder 100 includes components and circuits for operation using a capacitive stud sensor. FIG. 12 depicts one embodiment of suitable circuitry, although various alternative embodiments of such circuitry are known in the art. A controller 120 controls operation of the stud finder via touch switch 121 and capacitive sensor 122. Controller 120 may be a microprocessor controller. Capacitive sensor 122 may be part of or located very close to the bottom surface of the stud finder. The controller may also include a control resistor 124 and a power source 123, such as a battery. Light sources or light emitting diodes (LEDs) 125, 127 also are controlled by controller 120. In one embodiment, touch switch 121 is physically located on the bottom surface of the stud finder attachment, so that when the stud finder is pressed against a wall, switch 121 is closed, activating the stud finder and controller 120. Touch switch 121 is preferably a normally-open switch, so that the stud-finder is activated only when the switch is kept in the closed position by pressing the stud finder attachment against a wall or other surface. Touch switch 121 in FIG. 12 may be the same as switch 113 in FIG. 11 or may be different. In one embodiment, one of the LEDs may illuminate and remain illuminated as long as switch 121 remains closed.

Controller 120 or a memory 126 accessible to controller 120 may contain a calibration routine that is begun when the switch is closed. When a user presses the stud finder attachment against a wall or surface, the switch is closed and the controller runs a routine to calibrate the stud finder based on the capacitance sensed by sensor 122. Normally, upon startup, capacitive sensor 122 will sense only drywall or other relatively non-dense material, and will thus be calibrated for that level of capacitance. Normally, drywall of up to ¾ inch (about 19 mm) thickness will be sensed. If the user has activated calibration in an area having underlying, hidden support, such as a stud, the stud finder may have to be moved to a non-supported area for recalibration before beginning a search for studs or other hidden supports.

The user presses the stud finder against the wall, keeping touch switch 121 closed. When the stud finder moves to a region of higher density, the capacitance sensed by sensor 122 will increase. In one embodiment, red LEDs 125 may illuminate, one at a time, in reaction to higher perceived capacitance. In other embodiments, the LEDs may illuminate one at a time progressively and remain illuminated as the perceived capacitance increases. When a region of higher density, such as a stud behind a wall surface, has been located, the last LED, green LED 127 may illuminate to indicate "stud" or "stud edge". Of course, various lighting arrangements manual meters or other visual or audible indicators may be utilized.

In alternative embodiments, a metal detection circuit, such as that used to find nails or metal studs, and as known in the art, may be implemented in the device.

Figure 13:
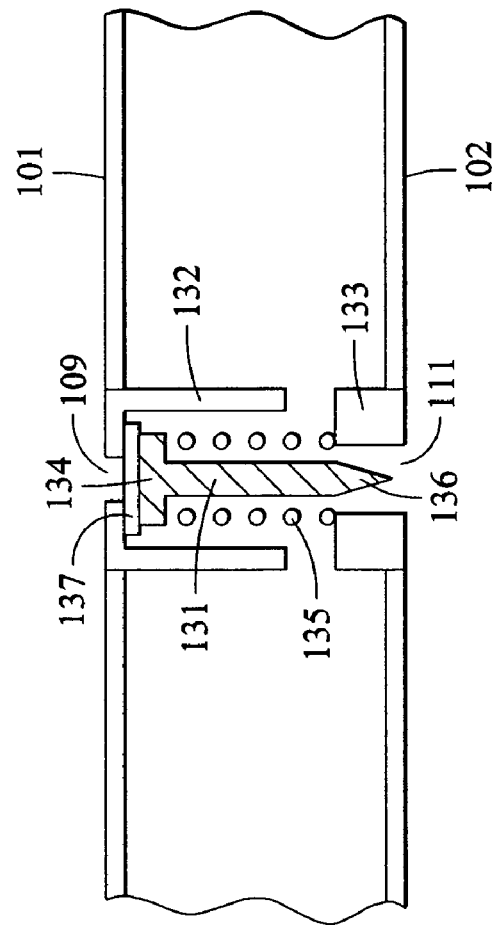
FIG. 13 is a cross-sectional view of an embodiment of a marking feature suitable for use with the attachment of FIG. 10.

The stud finder may also incorporate a marking feature, useful in marking location of studs or wall supports once they have been detected. FIG. 13 depicts an embodiment of an automatic marking feature contained within the stud finder housing portions 101, 102. The housing 101 may include an orifice 109 and a boss or recess 132 for retractably mounting a sharp pin 131 or other marker such as an ink marker. Bottom housing 102 may define an orifice 111 to allow pin 131 to selectively protrude and mark a wall or other surface on which a stud or support has been located. Bottom closure 102 may also include a boss 133 to support and restrain a spring 135. The spring 135 urges the pin 131 toward a retracted and concealed position as shown. When a user pushes the broad top 134 of pin 131, spring 135 is compressed, allowing the sharp point 136 of pin 131 to protrude through orifice 111 and mark the surface of interest. Pin 131 may be depressed by the action or actuator of retractable pin 26 from a mounted laser line generator 10, which, as described above, may also be spring-loaded. A button 137 or other structure may also allow for depression of pin 131 by a finger of a user, without using the laser line generator. Besides pin 131, the stud finder may have another marker, such as a pencil, a felt-tipped marker, an ink marker, or any other object with a point sharp enough and yet broad enough to leave a mark that is visible to a user of the stud finder. The marker may be spring-loaded as shown in FIG. 13.

The stud finder with laser light generator may be used by a user to locate studs or supports on a wall and then support and align objects on the wall. In use, the laser line generator 10 and the stud finder attachment 100 can be packaged as a separate from one another within a volume of space defined by a container, wherein the container, generator and base define a kit. Once the generator and stud finder attachment are removed from the container, the user may insert the laser line generator 10 into the stud finder base 100. The user then presses the bottom surface 110 of the stud finder base 100 against the wall. This depresses the switch 121 and activates the stud finder. The controller automatically performs a calibration and considers the density of the wall as the zero. The user then moves the stud finder 100 and generator 10 together slowly over the wall, and the LEDs illuminate when the density of the wall increases, such as when a stud is located. The user may then mark the wall by depressing the actuator 22 on the laser light generator 10 which causes the pin 26 to push button 137 downward, causing sharp pin or marker 131 of the stud finder to mark the wall. This process is repeated as many times as desired. The user may keep the stud finder in a horizontal plane or vertical plane by turning on the laser light generator and keeping the fan-shaped beam trained on a constant height or level by sighting on a distant object. In this manner, a series of studs or supports at a constant height (for horizontal alignment) or other location may be located and marked. Anchors or supports for objects on the walls may then be installed, with alignment on the stud assured. The stud finder may also be used alone to find and mark studs or supports with the actuator on its front surface.

Figure 14A:
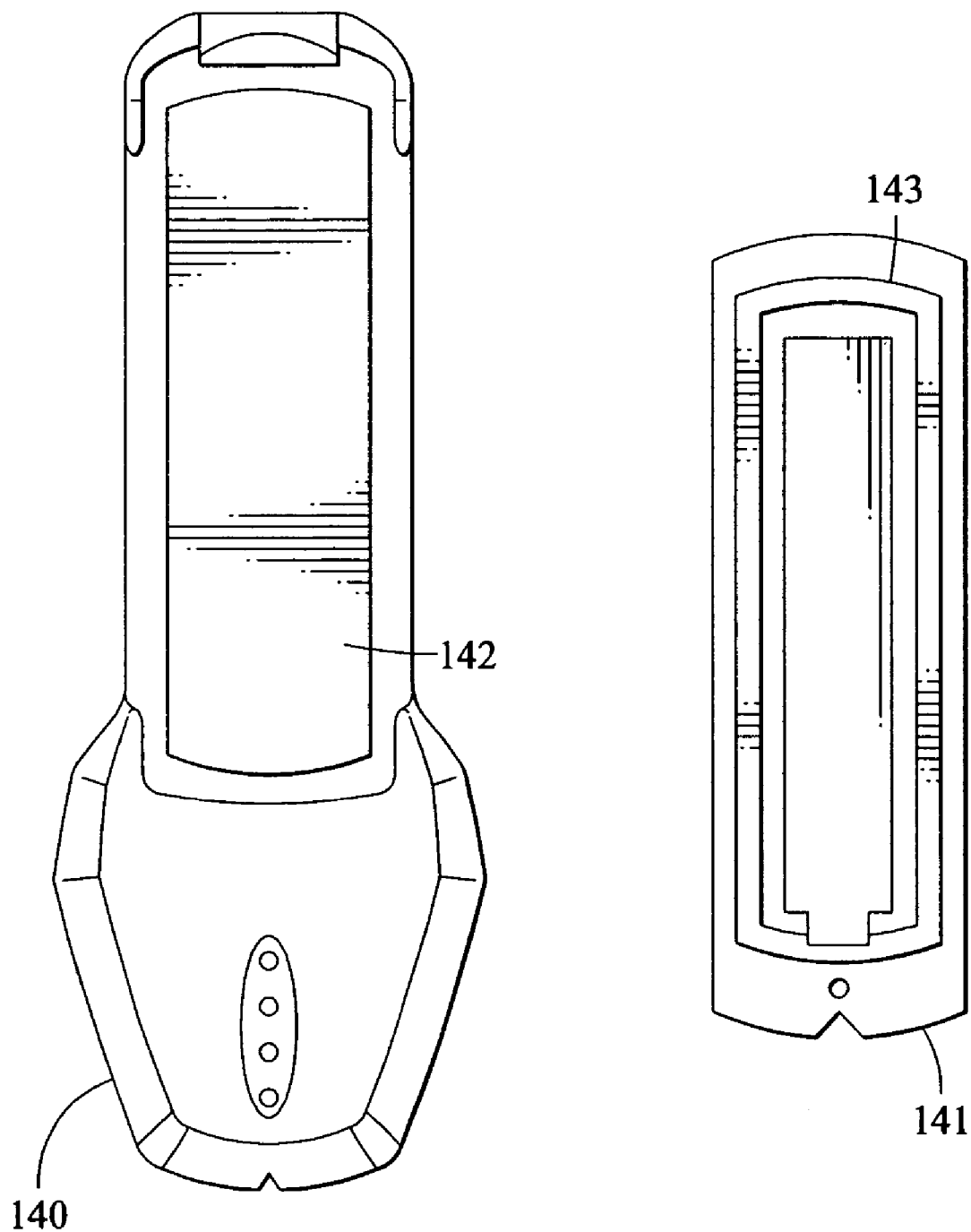
FIGS. 14A and 14B are schematic views of devices for attaching the light generator to the stud finder.
Figure 14B:
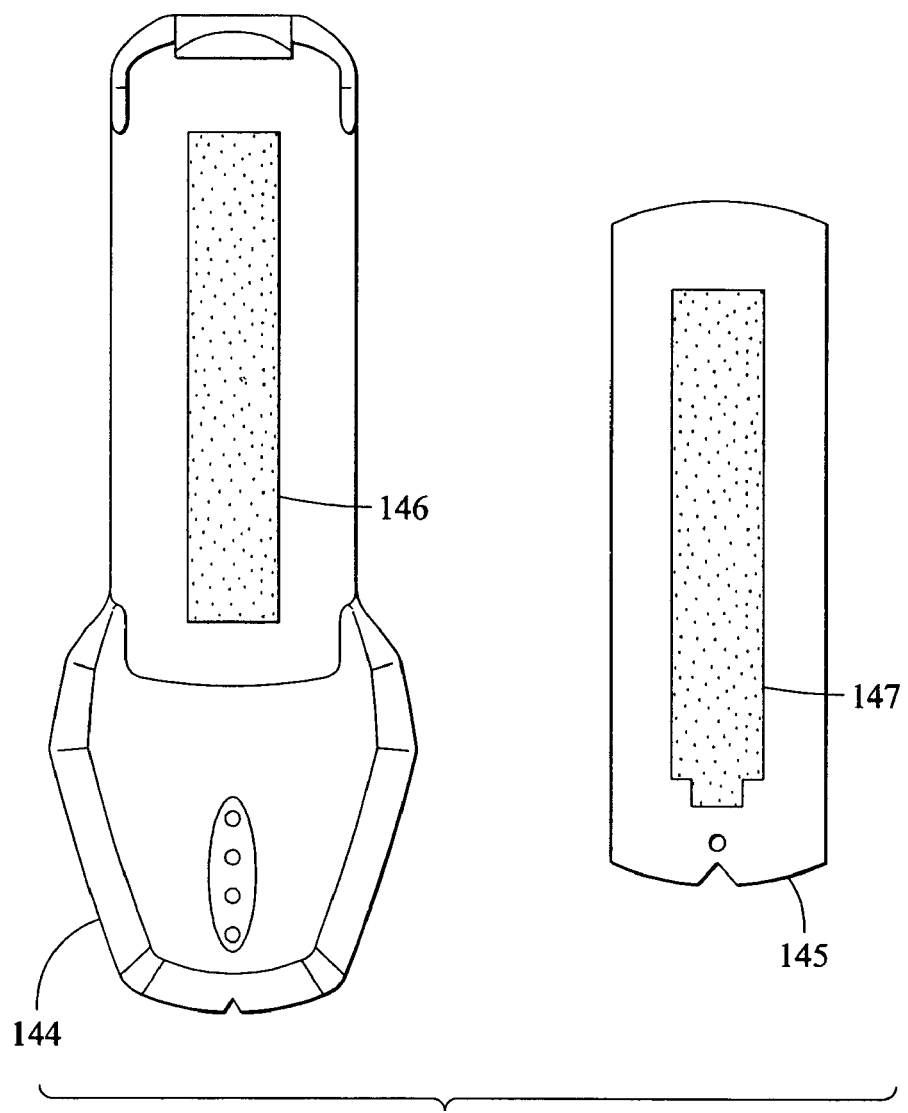
Figure 15:
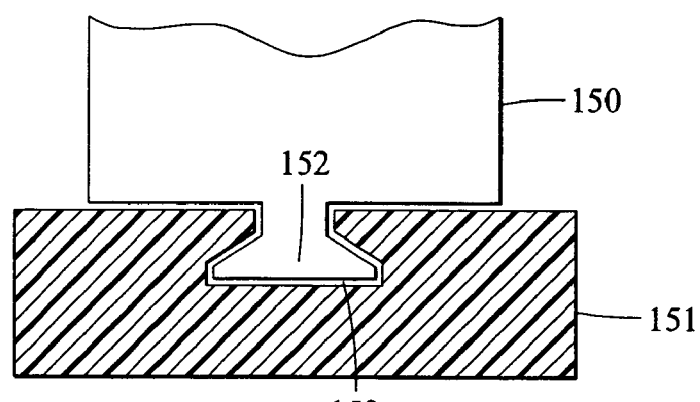
FIG. 15 is a partial cross-sectional view of another embodiment for attaching the light generator to the stud finder.

The invention has been described above with a light generator held onto a stud finder with a latch. There are other ways to retain the light generator onto the stud finder, as shown in FIGS. 14A, 14B, and 15. For instance, in FIG. 14A, the stud finder 140 may mount a ferrous plate 142 on its front face, while the light generator 141 mounts a magnet 143 on its bottom to attract and hold the ferrous plate and the stud finder. In another method, depicted in FIG. 14B, the light generator 144 mounts a hook portion 146 of a hook-and-loop fastener, such as Velcro®, while the stud finder 145 mounts the loop portion 147, to attract and hold the other portion and also light generator 144. As is well known, hook and loop fasteners are typically adhered to devices by an adhesive that very firmly bonds the fastener to the device. This adhesive attachment is an inherent part of the hook and loop fasteners herein described.

FIG. 15 depicts another way to mount the light generator 150 onto the stud finder 151, by providing a tab 152 on the bottom surface of the light generator, and by providing a matching slot 153 in the top surface of the stud finder, so that the light generator may be slid into the stud finder. A catch or latch may also be used to insure retention of the light generator when the assembly is held vertically.

While this invention has been shown and described in connection with the preferred embodiments, it is apparent that certain changes and modifications, in addition to those mentioned above, may be made from the basic features of this invention. While the stud finder attachment may be most useful when applied to walls, it may be used on other surfaces, such as floors and ceilings. While a sharp pin has been depicted as a marker for the stud finder attachment, other markers may be used, such as a pencil or pen that makes a mark on the wall when desired. Furthermore, the base 100 may mount the laser generator 10 rotatably or via a swivel, so that the surface 104 may rotate 90° or 180° relative to the bottom surface 110. In addition, the base 100 may be used to mount other types of leveling devices and other types of light generating devices. Many other variations of the invention may also be used without departing from the principles outlined above. Accordingly, it is the intention of the applicant to protect all variations and modifications within the valid scope of the present invention. It is intended that the invention be defined by the following claims, including all equivalents.

What is claimed is:

1. A stud finder for a light generating device or a leveling device, comprising:
   a surface; and
   a connection structure on the surface to removably mount either the light generating device or the leveling device thereto;
   wherein the stud finder is operable when either the light generating device or the leveling device is mounted thereto and wherein a portion of the connection structure is pivotably movable relative to the surface.

2. The stud finder of claim 1, further comprising a marking feature.

3. The stud finder of claim 2, wherein the marking feature is selected from the group consisting of a sharp point, a pencil, a pen, a felt-tipped pen, a marking pin, and a spring-biased marking pin.

4. The stud finder of claim 1, wherein the surface has at least one orifice for receiving at least one of a marking pin and a touch switch.

5. The stud finder of claim 1, further comprising a switch on the surface for activating the stud finder.

6. The stud finder of claim 1, wherein the surface comprises a flat surface and a recess for holding either the light generating device or the leveling device.

7. The stud finder of claim 1, wherein the connection structure comprises a latch for releasably holding the light generating device or the leveling device.

8. The stud finder of claim 1, wherein the connection structure is selected from the group consisting of a magnet, a magnetically attractive material, a hook fastener, a loop fastener, a tab, a slot, a flat surface, and a latch.

9. The stud finder of claim 1, further comprising at least one spring-loaded marking pin and an actuator for the pin.

10. The stud finder of claim 1, further comprising an enclosure for a power source, a capacitive sensor for detecting objects, a marking device, and at least one light for indicating a status of the stud finder.

11. The stud finder of claim 1, further comprising a capacitive sensor for detecting objects behind walls.

12. The stud finder of claim 1, further comprising a housing adapted for receiving and retaining the light generating device or the leveling device and for retaining components of the stud finder; and
   a controller, and a switch, a capacitive sensor and at least one light source connected to the controller.

13. A device comprising:
   a stud finder comprising:
      a connection structure; and
      a surface; and
   a light generating device removably attached to said stud finder via said connection structure,
   wherein the stud finder is operable with the light generating device attached thereto.

14. The device of claim 13, wherein the light generating device generates a laser beam.

15. The device of claim 13, wherein the light generating device generates light in the shape of a fan.

16. The device of claim 14, wherein the light generating device generates the laser beam with an asymmetric intensity.

17. The device of claim 13, wherein the connection structure further comprises a latch for capturing a portion of the light generating device.

18. The device of claim 13, wherein the light generating device comprises a latch that engages the connection structure.

19. The device of claim 13, wherein the connection structure comprises a magnet.

20. The device of claim 13, wherein the connection structure comprises a material that is magnetically attracted to the light generating device.

21. The device of claim 13, wherein the light generating device further comprises at least one retractable pin and an actuator for the pin.

22. The device of claim 13, further comprising a normally-open switch protruding through the surface.

23. The device of claim 13, further comprising at least one LED.

24. The device of claim 13, further comprising a marking device selected from the group consisting of a sharp point, a pencil, a pen, a felt-tipped pen, a marking pin, and a spring-biased marking pin.

25. A device comprising:
   a stud finder comprising:
      a connection structure;
      a surface; and
   a leveling device removably attached to said stud finder via said connection structure,
   wherein the stud finder is operable with the leveling device attached thereto and wherein the connection structure comprises a magnet.

26. The device of claim 25, wherein the connection structure further comprises a latch for capturing a portion of the leveling device.

27. The device of claim 25, wherein the leveling device comprises a latch that engages the connection structure.

28. A device comprising:
   a stud finder comprising:
      a connection structure;
      a surface; and
   a leveling device removably attached to said stud finder via said connection structure, wherein the stud finder is operable with the leveling device attached thereto and wherein the connection structure comprises a material that is magnetically attracted to the leveling device.

29. A device comprising:
a stud finder comprising:
a connection structure;
a surface; and
a leveling device removably attached to said stud finder via said connection structure,
wherein the stud finder is operable with the leveling device attached thereto and wherein the leveling device further comprises at least one retractable pin and an actuator for the pin.

30. The device of claim 25, further comprising a normally-open switch protruding through the surface.

31. The device of claim 25, further comprising at least one LED.

32. The device of claim 25, further comprising a marking device selected from the group consisting of a sharp point, a pencil, a pen, a felt-tipped pen, a marking pin, and a spring-biased marking pin.

33. An accessory attachment for a light generating device or a leveling device, comprising:
a structural detector having a surface that comprises a connection structure to receive and removably mount either the light generating device or the leveling device thereto; and
a marking feature at least partially enclosed within the structural detector,
wherein the structural detector is operable with either the light generating device or the leveling device mounted thereto and wherein a portion of the connection structure is pivotably movable relative to the surface.

34. The attachment of claim 33, wherein the structural detector further comprises a stud finder device.

35. An accessory attachment for a light generating device or a leveling device, comprising:
a structural detector having a surface that comprises a connection structure to receive and removably mount either the light generating device or the leveling device thereto; and
a marking feature at least partially enclosed within the structural detector,
wherein the structural detector is operable with either the light generating device or the leveling device mounted thereto and wherein the connection structure further comprises a magnet for securing the light generating device or the leveling device to the structural detector.

36. The attachment of claim 33, wherein the marking feature is actuatable to extend from the surface of the structural detector.

37. The attachment of claim 33, wherein the marking feature is selected from a group consisting of a sharp point, a pencil, a pen, a felt-tipped pen, a marking pin, and a spring-biased marking pin.

38. The attachment of claim 33, wherein the marking feature is actuatable by an actuator on the light generating device or the leveling device.

39. The attachment of claim 33, further comprising a switch protruding through the surface of the structural detector.

40. The attachment of claim 33, wherein the surface of the structural detector has at least one orifice for receiving at least one of a marking pin and a switch.

41. A method for finding a concealed feature and aligning objects on a surface, the method comprising:
inserting a leveling device into a structural detector, the structural detector comprising:
a connection structure adapted to removably mount the leveling device thereto; and
an exterior surface wherein a portion of the connection structure is pivotably movable relative to the exterior surface;
placing the exterior surface against a wall;
locating at least one concealed feature behind the wall using the structural detector while the leveling device is mounted thereto; and
marking the wall along a line defined by the leveling device.

42. A method for finding a concealed feature and aligning objects on a surface, the method comprising:
inserting a leveling device into a structural detector, the structural detector comprising:
a connection structure adapted to removably mount the leveling device thereto; and
an exterior surface;
placing the exterior surface against a wall;
locating at least one concealed feature behind the wall using the structural detector while the leveling device is mounted thereto; and
marking the wall along a line defined by the leveling device and wherein the leveling device comprises a light generating device.

43. The method of claim 42, wherein the light generating device generates a laser beam.

44. The method of claim 42, wherein the light generating device generates light in the shape of a fan.

45. The method of claim 42, wherein the light generating device generates the laser beam with an asymmetric intensity.

46. The method of claim 42, further comprising sighting on a distant object using light from the light generating device before the step of marking the wall.

47. The method of claim 42, further comprising connecting a battery to at least one of the structural detector or the light generating source.

48. The method of claim 41, further comprising the step of marking the wall using a marking device attached to the structural detector.

49. The method of claim 48, wherein the marking device is selected from the group consisting of a sharp point, a pencil, a pen, a felt-tipped pen, a marking pin, and a spring-biased marking pin.

50. A kit for a light generating device with a stud finder, comprising:
a container defining a volume of space;
a stud finder positioned within the volume of space, the stud finder comprising:
a surface; and
a connection structure; and
a light generating device positioned within the volume of space so as to be unattached to the stud finder, wherein the connection structure can be used to removably mount the light generating device to the surface, and
wherein the stud finder is operable with the light generating device mounted thereto.

51. The kit of claim 50, wherein the light generating device generates a laser beam.

52. The kit of claim 51, wherein the light generating device generates a laser beam with an asymmetric intensity.

53. The kit of claim 50, wherein the light generating device generates light in the shape of a fan.

54. The kit of claim 53, wherein the light generating device comprises a housing with a surface that extends along a first planar surface and the fan substantially lies within a second plane that intersects the first planar surface at an angle.

55. The kit of claim 50, wherein the light generating device further comprises a retractable pin and an actuator for the pin.

56. The kit of claim 50, wherein the connection structure comprises a latch.

57. The kit of claim 50, wherein the light generating device comprises a latch that engages the connection structure.

58. The kit of claim 50, wherein the connection structure comprises a magnet.

59. The kit of claim 50, wherein the connection structure comprises a material that is magnetically attracted to the light generating device.

60. A kit for a leveling device with a stud finder, comprising:
   a container defining a volume of space;
   a stud finder positioned within the volume of space, the stud finder comprising:
      a surface; and
      a connection structure; and
   a leveling device positioned within the volume of space so as to be unattached to the stud finder, wherein the connection structure can be used to removably mount the leveling device to the surface, and
   wherein the stud finder is operable with the leveling device mounted thereto and wherein a portion of the connection structure is pivotably movable relative to the surface.

61. A kit for a leveling device with a stud finder, comprising:
   a container defining a volume of space;
   a stud finder positioned within the volume of space, the stud finder comprising:
      a surface; and
      a connection structure; and
   a leveling device positioned within the volume of space so as to be unattached to the stud finder, wherein the connection structure can be used to removably mount the leveling device to the surface, and
   wherein the stud finder is operable with the leveling device mounted thereto and wherein the leveling device further comprises a retractable pin and an actuator for the pin.

62. The kit of claim 60, wherein the connection structure comprises a latch.

63. The kit of claim 60, wherein the leveling device comprises a latch that engages the connection structure.

64. A kit for a leveling device with a stud finder, comprising:
   a container defining a volume of space;
   a stud finder positioned within the volume of space, the stud finder comprising:
      a surface; and
      a connection structure; and
   a leveling device positioned within the volume of space so as to be unattached to the stud finder, wherein the connection structure can be used to removably mount the leveling device to the surface, and
   wherein the stud finder is operable with the leveling device mounted thereto and wherein the connection structure comprises a magnet.

65. A kit for a leveling device with a stud finder, comprising:
   a container defining a volume of space;
   a stud finder positioned within the volume of space, the stud finder comprising:
      a surface; and
      a connection structure; and
   a leveling device positioned within the volume of space so as to be unattached to the stud finder, wherein the connection structure can be used to removably mount the leveling device to the surface, and
   wherein the stud finder is operable with the leveling device mounted thereto and wherein the connection structure comprises a material that is magnetically attracted to the leveling device.

66. A device comprising:
   a stud finder comprising:
      a connection structure disposed on a first surface; and
      a normally open switch protruding through a second surface,
   wherein the stud finder, when operating to locate a structural member, locates the structural member through the second surface.

67. The device of claim 66, further comprising a marker selected from the group consisting of a sharp point, a pencil, a pen, a felt-tipped pen, a marking pin and a spring-biased marking pin.

68. The device of claim 67, wherein the marker is contained within the device.

69. The device of claim 66, wherein the connection structure is selected from the group consisting of a magnet, a magnetically attractive material, a hook fastener, a loop fastener, a tab, a slot, a flat surface, and a latch.

70. The device of claim 66, further comprising a controller and a capacitive sensor and at least one light source connected to the controller.

71. The device of claim 66, further comprising a light generating device mounted to the connection structure.

72. The device of claim 71, wherein the light generating device comprises a connection structure complementary to the connection structure of the stud finder.

73. The device of claim 66, wherein the normally biased open switch is a normally open momentary switch.

74. The device of claim 66, wherein the normally open switch becomes activated when a force is applied to the normally open switch and becomes deactivated when the force is removed from the normally open switch.

75. A device for locating an object behind a structural surface comprising:
   a stud finder having a housing with a first surface and a second surface, wherein the second surface is adapted to be disposed adjacent to the structural surface when the device is locating an object behind the structural surface; and
   a normally open switch protruding through the second surface.

76. The device of claim 75, further comprising a marker selected from the group consisting of a sharp point, a pencil, a pen, a felt-tipped pen, a marking pin and a spring-biased marking pin.

77. The device of claim 76, wherein the marker is contained within the device.

78. The device of claim 75, further comprising a connection structure on an external surface of the stud finder.

79. The device of claim 78, wherein the connection structure is selected from the group consisting of a magnet, a magnetically attractive material, a hook fastener, a loop fastener, a tab, a slot, a flat surface, and a latch.

80. The device of claim 75, further comprising a controller and a capacitive sensor and at least one light source connected to the controller.

81. The device of claim 75, wherein the normally open switch becomes activated when a force is applied to the normally open switch and becomes deactivated when the force is removed from the normally open switch.

* * * * *

UNITED STATES PATENT AND TRADEMARK OFFICE
CERTIFICATE OF CORRECTION

| | |
|---|---|
| PATENT NO. | : 7,013,570 B2 |
| APPLICATION NO. | : 10/612199 |
| DATED | : March 21, 2006 |
| INVENTOR(S) | : Steven R. Levine et al. |

Page 1 of 1

It is certified that error appears in the above-identified patent and that said Letters Patent is hereby corrected as shown below:

In Claim 73, lines 48/49, please delete "normally biased open" and insert --normally open--.

Signed and Sealed this

Sixth Day of February, 2007

JON W. DUDAS
*Director of the United States Patent and Trademark Office*